United States Patent
Boutaud

(10) Patent No.: US 10,914,817 B2
(45) Date of Patent: Feb. 9, 2021

(54) MULTIPATH INTERFERENCE ERROR CORRECTION IN A TIME OF FLIGHT SENSOR

(71) Applicant: Rockwell Automation Technologies, Inc., Mayfield Heights, OH (US)

(72) Inventor: Frederic Boutaud, Lexington, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 138 days.

(21) Appl. No.: 16/370,016

(22) Filed: Mar. 29, 2019

(65) Prior Publication Data
US 2020/0309898 A1    Oct. 1, 2020

(51) Int. Cl.
G06T 7/70   (2017.01)
G01S 7/02   (2006.01)
G01S 17/42  (2006.01)
G06T 7/521  (2017.01)

(52) U.S. Cl.
CPC .............. *G01S 7/023* (2013.01); *G01S 17/42* (2013.01); *G06T 7/521* (2017.01); *G06T 7/70* (2017.01); *G06T 2207/10028* (2013.01)

(58) Field of Classification Search
None
See application file for complete search history.

(56) References Cited

U.S. PATENT DOCUMENTS

| 9,542,749 | B2 | 1/2017 | Freedman et al. |
| 2015/0193938 | A1* | 7/2015 | Freedman ............... G01S 17/36 382/154 |
| 2015/0334371 | A1* | 11/2015 | Galera ............... G06K 9/00201 348/46 |
| 2015/0346340 | A1* | 12/2015 | Yaacobi ............... G01S 7/4915 356/5.11 |

* cited by examiner

*Primary Examiner* — Eileen M Adams
(74) *Attorney, Agent, or Firm* — Amin, Turocy & Watson, LLP

(57) ABSTRACT

A three-dimensional (3D) sensor device achieves accurate distance measurements in the presence of multipath illumination interference (MPII) by estimating the effect of indirect illumination on a given pixel's optical signal measurement and correcting the signal measurement to remove the estimated contribution from indirect illumination. After generating an initial point cloud image of a scene, the sensor device identifies target objects and background objects within the scene, where the background objects are potential sources of indirect illumination. The sensor device estimates the total amount of indirect illumination directed to a point on the target object by the background objects and received at a pixel corresponding to the point, and corrects the measured signal at the pixel to remove the contribution of this estimated indirect illumination. The sensor device performs this MPII estimation without a priori knowledge of the background objects' characteristics, and is therefore response to changes in the background.

20 Claims, 24 Drawing Sheets

MULTIPATH INTERFERENCE ERROR CORRECTION IN A TIME OF FLIGHT SENSOR

BACKGROUND

The subject matter disclosed herein relates generally to optical sensor devices, and, more particularly, to optical sensors that operate within environments conducive to multipath illumination interference.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a sensor device is provided, comprising an emitter component configured to emit light pulses into a monitored scene; a photo-sensor component comprising an array of pixels, wherein respective pixels of the array of pixels are configured to convert a subset of the light pulses received from the monitored scene to electrical energy proportional to the subset of the light pulses received at the pixels; a distance determination component configured to determine distance values associated with the respective pixels based on analysis of the electrical energy and to generate a point cloud image comprising the distance values; and a multipath correction component configured to identify a first portion of the point cloud image representing a target object, identify a second portion of the point cloud image representing a background object, model the background object as an array of elementary point sources based on the distance values of the point cloud image, estimate amounts of indirect irradiance directed to a point on the target object by the elementary point sources and received at a pixel, of the array of pixels, corresponding to the point on the target object, aggregate the amounts of indirect irradiance to yield a total estimated indirect irradiance directed to the point on the target object and received at the pixel, and adjust a distance value, of the distance values, associated with the pixel based on the total estimated indirect irradiance to yield an updated distance value for the point on the target object.

Also, one or more embodiments provide a method for correcting errors in measured distance values caused by multipath illumination interference, comprising emitting, by a sensor device comprising a processor, light pulses into a monitored area; for respective pixels of a pixel array of the sensor device, generating, by the sensor device, electrical energy proportional to a subset of the light pulses received at the respective pixels from surfaces within the monitored area; determining, by the sensor device based on measurements of the electrical energy for the respective pixels, distance values associated with the respective pixels; generating, by the sensor device, a point cloud image comprising the distance values; identifying, by the sensor device, a target object represented by a first portion of the point cloud image; identifying, by the sensor device, a background object represented by a second portion of the point cloud image; modeling, by the sensor device, an array of elementary point sources across a surface of the background object based on analysis of the second portion of the point cloud image; estimating, by the sensor device, respective levels of indirect irradiance directed to a point on the target object by the elementary point sources and received at a pixel, of the array of pixels, corresponding to the point on the target object; integrating, by the sensor device, the levels of indirect irradiance to yield a total estimated indirect irradiance directed to the point on the target object and received at the pixel; and modifying, by the sensor device, a distance value, of the distance values, associated with the pixel based on the total estimated indirect irradiance to yield an updated distance value for the point on the target object.

Also, according to one or more embodiments, a non-transitory computer-readable medium is provided having stored thereon instructions that, in response to execution, cause a sensor device comprising a processor to perform operations, the operations comprising emitting light pulses into a monitored scene; for respective pixels of a pixel array of the sensor device, generating electrical energy proportional to a subset of the light pulses scattered by surfaces within the monitored scene and received at the respective pixels; determining, based on measurements of the electrical energy for the respective pixels, distance values associated with the respective pixels; generating point cloud data comprising the distance values; identifying a first portion of the point cloud data representing a target object in the monitored scene; identifying a second portion of the point cloud data representing a background object in the monitored scene; modeling an array of elementary point sources across a surface of the background object based on analysis of the second portion of the point cloud data; estimating respective quantities of indirect irradiance directed to a point on the target object by the elementary point sources and received at a pixel, of the array of pixels, corresponding to the point on the target object; integrating the quantities of indirect irradiance to yield a total estimated indirect irradiance directed to the point on the target object and received at the pixel; and updating a distance value, of the distance values, associated with the pixel based on the total estimated indirect irradiance to yield an updated distance value for the point on the target object.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
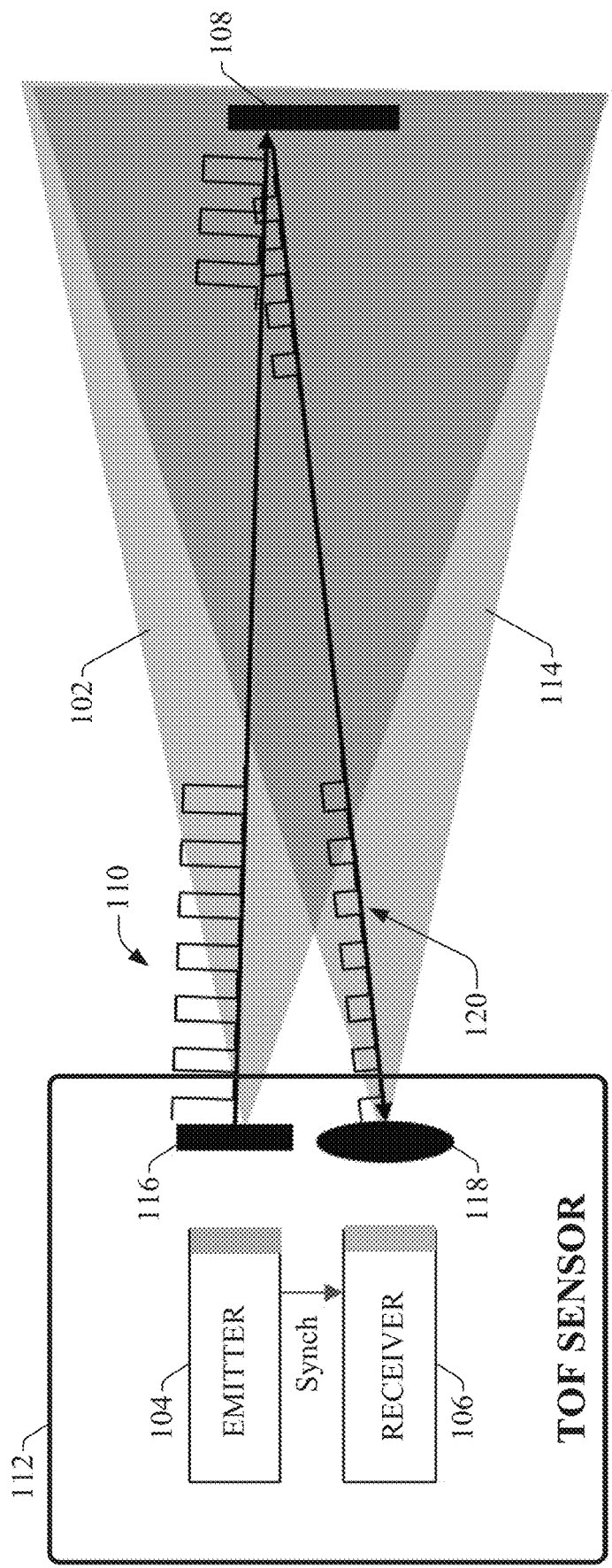
FIG. 1 is a generalized block diagram of a TOF sensor illustrating pulsed light time of flight principles.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Many technologies exist for detecting distances of objects or surfaces within a monitored space. These include, but are not limited to, time of flight (TOF) optical sensors or other types of three-dimensional sensors—such as photo detectors or multi-pixel image sensors—which are used to detect distances of objects or surfaces within a viewing range of the sensor. These optical sensors can include, for example, photo detectors that measure and generate a single distance data point for an object within range of the detector, as well as multi-pixel image sensors comprising an array of photo-detectors that are each capable of generating a distance data point for a corresponding image pixel. Some three-dimensional optical sensors, such as stereo vision technology (for a passive sensor) or structured light technology (for active sensor) measure distances using triangulation.

Some types of TOF sensors that employ pulsed light illumination measure the elapsed time between emission of a light pulse to the viewing field (or viewing space) and receipt of a reflected light pulse at the sensor's photo-receiver. Since this time-of-flight information is a function of the distance of the object or surface from the sensor, the sensor is able to leverage the TOF information to determine the distance of the object or surface point from the sensor.

FIG. 1 is a generalized block diagram of a TOF sensor 112 illustrating pulsed light time of flight principles. The TOF sensor 112 includes an illumination light source—represented by emitter 104 and associated illumination optics 116 in FIG. 1—that projects light 102 modulated with pulses 110. The space encompassed by the projected modulated light 102 represents the field of illumination (FOI). Objects and surfaces within the viewing field, such as object 108, reflect part of the pulses' radiation back to the TOF sensor's imaging lens 118, which directs the received pulses 120 to pixels of receiver 106 (e.g., a photo-detector or a photo-sensor such as a photo-diode). A subset of the modulated light 114—including reflected pulses 120—is scattered by objects and surfaces in the scene, and a portion of this scattered pulsed illumination is received at the TOF sensor's imaging lens 118 and associated receiver 106 (e.g., light photo-detectors). Receiver 106 can include, for example a dedicated multi-pixel CMOS (complementary metal oxide semiconductor) application-specific integrated circuit (ASIC) imager that integrates specialized means for measuring the position in time of received pulses 120. In general, the sensing technology used by some TOF sensors measures the time taken by a light pulse to travel from the sensor's illumination light source to an object 108 or surface within the viewing field and back to the sensor's light photo-detectors. Distance measurement components can measure the distance d to the object 108 as $$d=ct/2 \qquad (1)$$

where c is the speed of light, and t is the measured time of the round trip for the pulse from the emitter 104 to the object 108 and back to the receiver 106.

Since the speed of light c is a known constant and the time t elapsed between emission and reception of the pulse 110 can be measured, the TOF sensor's distance measuring components can determine, for each pixel of the receiver 106, the distance between the object 108 and the sensor by calculating half of the round-trip distance, as given by equation (1) above. Collectively, the distance information obtained for all pixels of the viewing space yields depth map or point cloud data for the viewing space. In some implementations, the TOF sensor's distance measurement components can include a timer that measures the arrival time of a received pulse relative to the time at which emitter 104 emitted the pulse, or may include demodulation circuitry that determines the measured time of the pulse's round trip by comparing the phase of the received pulse with its corresponding emitted pulse. In general, the TOF sensor 112 generates information that is representative of the position in time of the received pulse.

Each pixel of the captured image has an associated photo-receiver or photo-detector. When radiation of a reflected pulse 120 is incident on the photo-receivers or photo-detectors that make up sensor 112, the incident light is converted into an electrical output proportional to the intensity of the incident light. The distance measurement components can then recover and analyze the electrical output in order to identify the pulse, thereby determining that the reflected pulse has been received at the receiver 106.

In some implementations, the sensor's emitter 104 may emit a burst of pulses into the scene for a given measuring sequence and perform the distance measurement based on an accumulation of multiple received pulses reflected back to the sensor. The photo-detectors of receiver 106 can accumulate electrical charges based on the exposure duration of the receiver 106 to the received light pulse radiation relative to a time reference. The accumulated charges on a given photo-detector translate into a voltage value that, evaluated over time, defines a demodulated pulse waveform that is recognizable by the distance measurement components. Once the pulse is identified in this manner, the TOF sensor 112 can estimate the time that the reflected pulse was received at the photo-detector relative to the time that the pulse was emitted (e.g., based on phase shift analysis or other types of analysis performed on the pulse waveform), and the distance associated with the corresponding pixel can be estimated based on this time using equation (1) (or another distance determination equation or algorithm that defined distance as a function of light pulse propagation time).

If a TOF sensor's distance calculation capabilities are sufficiently reliable, the sensor can serve as an industrial safety device for an industrial safety system. In an example implementation, the TOF sensor could be oriented to monitor for intrusion of people or objects within a defined industrial area or zone, and to initiate a safety action in response to a determination that a measured distance of a detected person or object within the monitored zone satisfies a defined criterion (e.g., when the distance is less than a defined safe distance from hazardous industrial equipment or a prohibited equipment area). Such safety actions can include, for example, disconnecting power from a hazardous automated machine, placing the machine in a safe operating mode (e.g., a slow operating mode), altering the trajectory of the machine to avoid the path of a detected person, etc. If used in such industrial safety applications, the TOF sensor must be able to detect the presence of an object with a high level of certainty in order to meet standard safety requirements and to guarantee safe operation of the industrial equipment. Viewed another way, the distance detection capabilities of the TOF sensor must be such that the probability of failing to detect an object within the TOF sensor's field of view is low. Ideally, this high level of object detection reliability should be achieved while minimizing the probability of false object detection alerts, which can result in unnecessary safety countermeasure being initiated, translating to excessive machine downtime and lost productivity.

In the case of TOF distance measurement sensors, in which distance measurement is based on demodulation of a pulse burst sequence, multipath interference—or, more specifically, multipath illumination interference (MPII)—can introduce errors into the TOF sensor's distance measurement. Multipath illumination interference results when an object in the viewing field receives illumination light not only via a direct propagation path between the TOF sensor's illumination source and the target object, but also via multiple indirect, or secondary, paths. These indirect illumination paths are produced when illumination light is reflected off of other objects, barriers, or walls within the field of illumination prior to reaching the object of interest (or target object), before finally returning to the sensor. When reflected pulses from these longer secondary paths are combined with reflected pulses from the direct illumination at a pixel corresponding to the target object, errors can be introduced in the demodulation process for that pixel, potentially distorting the distance measurement. MPII can be a particular problem for multi-pixel sensors or multi-point sensors that require a wide illumination in order to sense or observe multiple points in space at the same time.

In an example monitoring environment, a large sidewall within the field of illumination can yield multiple light paths that, when accumulated on a point on a target object, may produce a secondary signal that is sufficiently large to distort the measurement of the direct light obtained via a direct round-trip path between the sensor 112 and the object 108. If interference from these secondary signals is large enough, this multipath illumination interference modifies the received signal and distorts the distance measurement in a manner that typically causes the object 108 to appear further away than its true distance.

In general, multipath interference is experienced on a given pixel when light is received at that pixel from the same target object via different paths of different lengths. Since the times of flight of the multiple paths are different due to the different propagation path lengths, the signal received by the pixel experiences pulse distortion, improper pulse combinations, or other errors that can reduce the accuracy of the perceived distance to the object 108. Every pixel having this object 108 in its field of view may be affected by such interference.

To address these and other issues, one or more embodiments described herein provide a TOF sensor capable of estimating the contribution of multipath illumination interference to a measured signal at each pixel and correcting the measured signal to remove this estimated contribution of multipath illumination interference, thereby yielding more accurate distance measurements even in the presence of MPII. The TOF sensor can estimate the effect of MPII due to background objects in the scene without a priori knowledge of the shape, size, orientation, or reflectivity of the background object. In one or more embodiments, after an initial distance measurement of the monitored area, the TOF sensor can detect a target object of interest within the scene (that is, the object whose distance is to be evaluated) as well as one or more background objects that may be sources of multipath illumination interference. The TOF sensor models the background object as an array of elementary point sources that each scatter a portion of the sensor's illumination toward the target object as secondary (or indirect) illumination, thus contributing to multipath interference. The TOF sensor then determines a set of characteristics of each modeled elementary point source, which may include the point source's distance from the sensor, coordinates, scattering area, reflectivity index, incoming irradiance, and vector normal.

Based on these characteristics, the TOF sensor estimates the amount of indirect irradiance that is directed to the target object by each elementary secondary point source and received by a pixel representing a point on the target object. The TOF sensor then integrates these estimated amounts of indirect irradiance from all of the elementary point sources to yield a total estimated amount of indirect irradiance received at the pixel. This total estimated indirect irradiance is converted to an electrical measure and subtracted from the total measured signal at the pixel to yield a corrected pulse waveform signal for the pixel. The TOF sensor then uses this corrected pulse waveform to calculate the propagation time and associated distance for the pixel.

Figure 2:
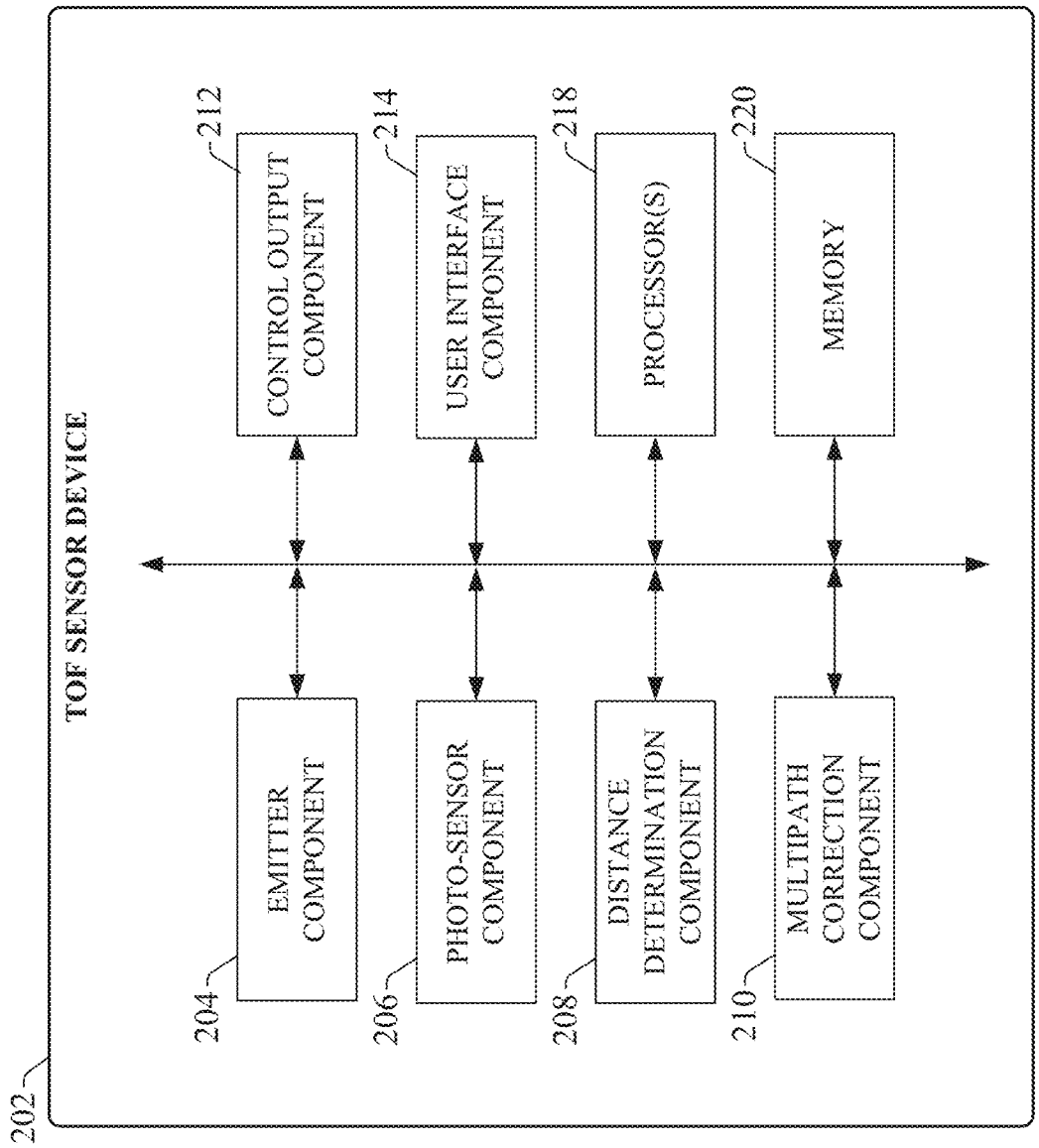
FIG. 2 is a block diagram of an example TOF sensor device.

FIG. 2 is a block diagram of an example TOF sensor 202 according to one or more embodiments of this disclosure. Although FIG. 2 depicts certain functional components as residing on TOF sensor 202, it is to be appreciated that one or more of the functional components illustrated in FIG. 2 may reside on a separate device relative to TOF sensor 202 in some embodiments. Also, although the subject multipath correction techniques are described herein in connection with TOF sensor devices, it is to be appreciated that the multipath correction techniques described herein can be implemented in other types of 3D sensors that are capable of generating a distance map or point cloud data. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

TOF sensor 202 can include an emitter component 204, a photo-sensor component 206, a distance determination component 208, a multipath correction component 210, a control output component 212, a user interface component 214, one or more processors 218, and memory 220. In various embodiments, one or more of the emitter component 204, photo-sensor component 206, distance determination component 208, multipath correction component 210, control output component 212, user interface component 214, the one or more processors 218, and memory 220 can be electrically and/or communicatively coupled to one another to perform one or more of the functions of the TOF sensor 202. In some embodiments, one or more of components 204, 206, 208, 210, 212, and 214 can comprise software instructions stored on memory 220 and executed by processor(s) 218. TOF sensor 202 may also interact with other hardware and/or software components not depicted in FIG. 2. For example, processor(s) 216 may interact with one or more external user interface devices, such as a keyboard, a mouse, a display monitor, a touchscreen, or other such interface devices. TOF sensor 202 may also include network communication components and associated networking ports for sending data generated by any of components 204, 206, 208, 210, 212, and 214 over a network (either or both of a standard data network or a safety network), or over a backplane.

Emitter component 204 can be configured to control emission of light by the TOF sensor 202. TOF sensor 202 may comprise a laser or light emitting diode (LED) light source under the control of emitter component 204. Emitter component 204 can generate pulsed light emissions directed to the monitored space so that time-of-flight information for the reflected light pulses can be generated by the TOF sensor 202 (e.g., by the distance determination component 208).

Photo-sensor component 206 can be configured to convert light energy incident on a photo-receiver or photo-detector array to electrical energy for respective pixels of a monitored space, and measure this electrical energy for the purposes of pulse identification and distance analysis. In some embodiments, photo-sensor component 206 can selectively control the storage of the converted electrical energy in various electrical storage components (e.g., measuring capacitors) for subsequent distance analysis. Distance determination component 208 can be configured to determine a propagation time (time of flight) of emitted light pulses received at respective pixels based on the stored electrical energy generated by the photo-sensor component 206, and to further determine a distance value of an object or surface corresponding to a pixel within the viewing space based on the determined propagation time.

Multipath correction component 210 can be configured to identify background objects in the monitored space that are potential sources of multipath illumination interference, and estimate a total amount of secondary irradiance received at the photo-sensor component 206 as a result of this background object. For each pixel corresponding to the target object, multipath correction component 210 can determine a contribution of this secondary illumination to the total signal measured by the pixel, and correct the demodulated pulse waveform measured for the pixel by removing these estimated contributions of secondary irradiance. This corrected pulse waveform can be used by the distance determination component 208 to recalculate the propagation time and associated distance value for the pixel, yielding a corrected distance value that is substantially unaffected by secondary illumination.

The control output component 212 can be configured to control one or more sensor outputs based on results generated by the distance determination component 208 and multipath correction component 210. This can include, for example, sending an analog or digital control signal to a control or supervisory device (e.g., an industrial controller, an on-board computer mounted in a mobile vehicle, etc.) to perform a control action, initiating a safety action (e.g., removing power from a hazardous machine, switching an industrial system to a safe operating mode, etc.), sending a feedback message to one or more plant personnel via a human-machine interface (HMI) or a personal mobile device, sending data over a safety network, or other such signaling actions. In various embodiments, control output component 212 can be configured to interface with a plant network (e.g., a control and information protocol network, and Ethernet/IP network, a safety network, etc.) and send control outputs to other devices over the network connection, or may be configured to send output signals via a direct hardwired connection.

User interface component 214 can be configured to receive user input and to render output to the user in any suitable format (e.g., visual, audio, tactile, etc.). In some embodiments, user interface component 214 can be configured to communicate with a graphical user interface (e.g., a programming or development platform) that executes on a separate hardware device (e.g., a laptop computer, tablet computer, smart phone, etc.) communicatively connected to TOF sensor 202. In such configurations, user interface component 214 can receive input parameter data entered by the user via the graphical user interface, and deliver output data (e.g., device status, health, or configuration data) to the interface. Input parameter data can include, for example, normalized pulse shape data that can be used as reference data for identification of irregularly shaped pulses, light intensity settings, minimum safe distances or other distance threshold values to be compared with the measured distance values for the purposes of determining when to initiate a control or safety output, or other such parameters. Output data can comprise, for example, status information for the TOF sensor 202, alarm or fault information, parameter settings, or other such information.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3A:
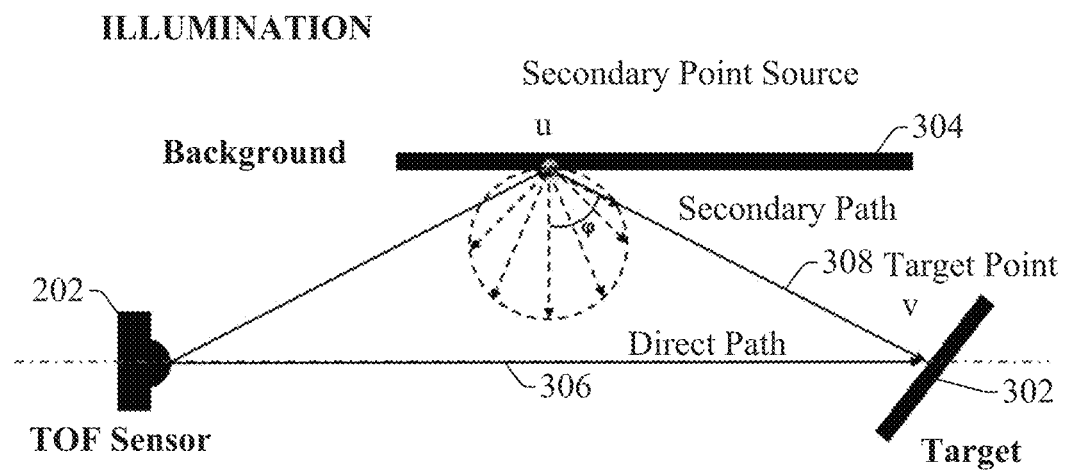
FIG. 3a is a schematic illustrating an illumination scenario in which light from a TOF sensor is emitted into a field of view, and a point v on a target object receives light via both a direct path and a secondary path.
Figure 3B:
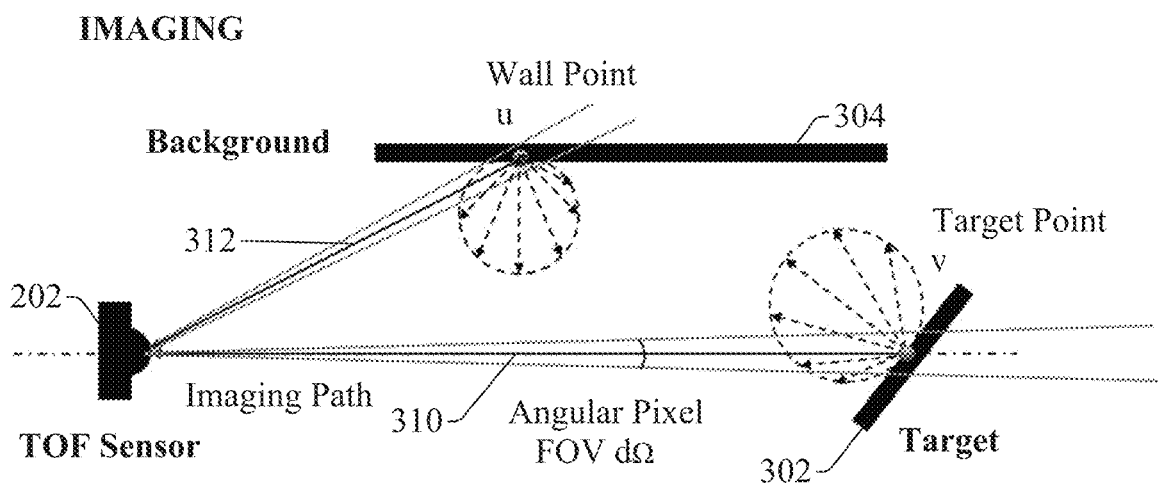
FIG. 3b is a schematic illustrating reflected light returning to the TOF sensor from the field of view, wherein light from a point source v on the target object is received at the TOF sensor and imaged on a pixel, and light from a point source u on a background object is also received at the TOF sensor and imaged on a different pixel.

FIG. 3a is a schematic illustrating an illumination scenario in which light from a TOF sensor 202 is emitted into a field of view, and a point v on a target object 302 receives light via both a direct path 306 and a secondary path 308, the secondary path 308 being directed to the target object 302 via a background object 304. For clarity, only a single direct path 306 (to point v) and a single indirect path 308 are shown in FIG. 3a; however, there may be multiple secondary paths of illumination received at point v of target object 302, sourced by a single background object 304 or multiple background objects. FIG. 3b is a schematic illustrating reflected light returning to the TOF sensor from the field of view, wherein light 310 from point source v on the target object 302 is received at the TOF sensor 202 and imaged on a pixel, and light 312 from a point source u on the background object 304 is also received at the TOF sensor 202 and imaged on a different pixel. In the illustrated example, the background object 304 (e.g., a wall or other object) is assumed to be diffuse, and therefore the light components sourced from the background object 304 toward the target object 302 is due to diffuse, or Lambertian, reflection. Light reflected from point u on the background object 304 toward target object 302 as a Lambertian reflection is only a fraction of the irradiance received by the surface of the background object 304. This fraction is inversely proportional to the square of the distance from background object 304 to the target object 302, and is proportional to cosine of the angle φ between the secondary path 308 and the normal to the reflective surface of the background object 304.

Figure 4:
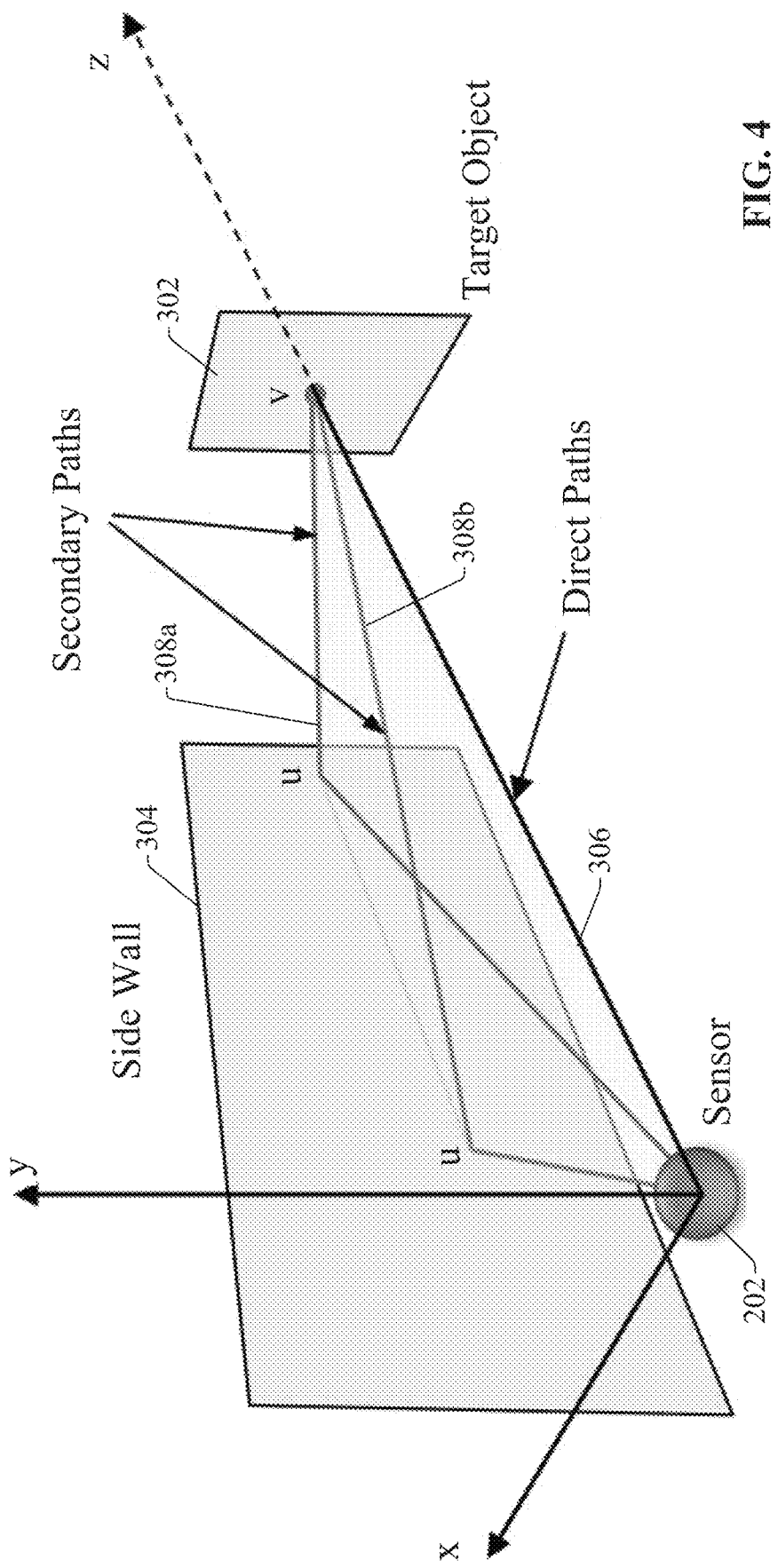
FIG. 4 is a 3D perspective view of a scenario depicting multiple secondary illumination paths that are to be integrated over the area produced by a background object.

FIG. 4 is a 3D perspective view of the scenario depicted in FIGS. 3a and 3b, depicting multiple secondary illumination paths 308a and 308b, from the sensor 202 to the point u on the wall and to the point v on the target object 302, that are to be integrated over the area produced by the background object 304 (a side wall in the illustrated example). Since secondary indirect illumination may be reflected from any point of the illuminated area of the background object 304, target point v on the target object 302 may receive secondary light from a multitude of point sources u from this background object 304. For clarity, only two illumination paths 302a and 308b are depicted in FIG. 4; however, the total secondary illumination from background object 304 will typically be an integration of multiple secondary paths 308 (from respective multiple point sources u) over the area of the background object within the sensor's field of illumination. When integrated onto the target point v, the total light intensity from these multiple secondary point sources may be large enough relative to the direct illumination (represented by path 306) to adversely impact the distance measurement.

Embodiments of the TOF sensor 202 described herein implement a method for predicting the secondary illumination sourced by a background object toward a target object and estimating the error that this predicted secondary illumination induces in the measurement and calculation of the distance from the sensor to target object. To this end, embodiments of the TOF sensor 202 can estimate one or more characteristics of the reflective background object in connection with estimating the secondary illumination that will be produced by the background object. Depending on the application and product requirements, parameters representing characteristics of the reflective background object can be pre-defined, taught, or measured live by the TOF sensor 202. The characteristic of the background object can also be obtained using a combination of those approaches depending on the parameters and specifics of the application. For example, an initial value of one or more characteristic parameters of the background object can be taught to the TOF sensor 202, or may be measured or estimated by the TOF sensor itself during an initialization measurement of the scene to be monitored. Subsequently, during operation, the TOF sensor 202 can update these characteristic parameters to accommodate for small variations of the background object's characteristics over time. The characteristic parameters can represent, for example, the shape and orientation of the background object 304. The parameters may define, for example, that the background object is flat and contained within a plane parallel to the sensor's optical axis, or may define a curved contour of the background object's surface. The estimation and correction method implemented by the TOF sensor 202 is independent of both the background reflectivity of the background object and the distance of the background object from the TOF sensor's optical axis, both of which may change over time.

When the background object 304 is in the field of illumination and in the field of view of the TOF sensor 202, it can be assumed that the background object 304 is viewed by a number of the sensor's pixels. Those pixels can provide information used by the sensor 202 to estimate characteristics of the indirect illumination received by the target object 302. Based on characteristics of the background object 304 as defined by these measured or learned parameters, the TOF sensor 202 can estimate the multipath interference sourced by the background object 304 and correct the distance measurement error induced by this multipath interference at the pulse demodulation level. The technique implemented by embodiments of TOF sensor 202 for estimating and correcting for MPII does not require a priori knowledge of the background object's shape, size, position, orientation, or reflectivity index.

Figure 5:
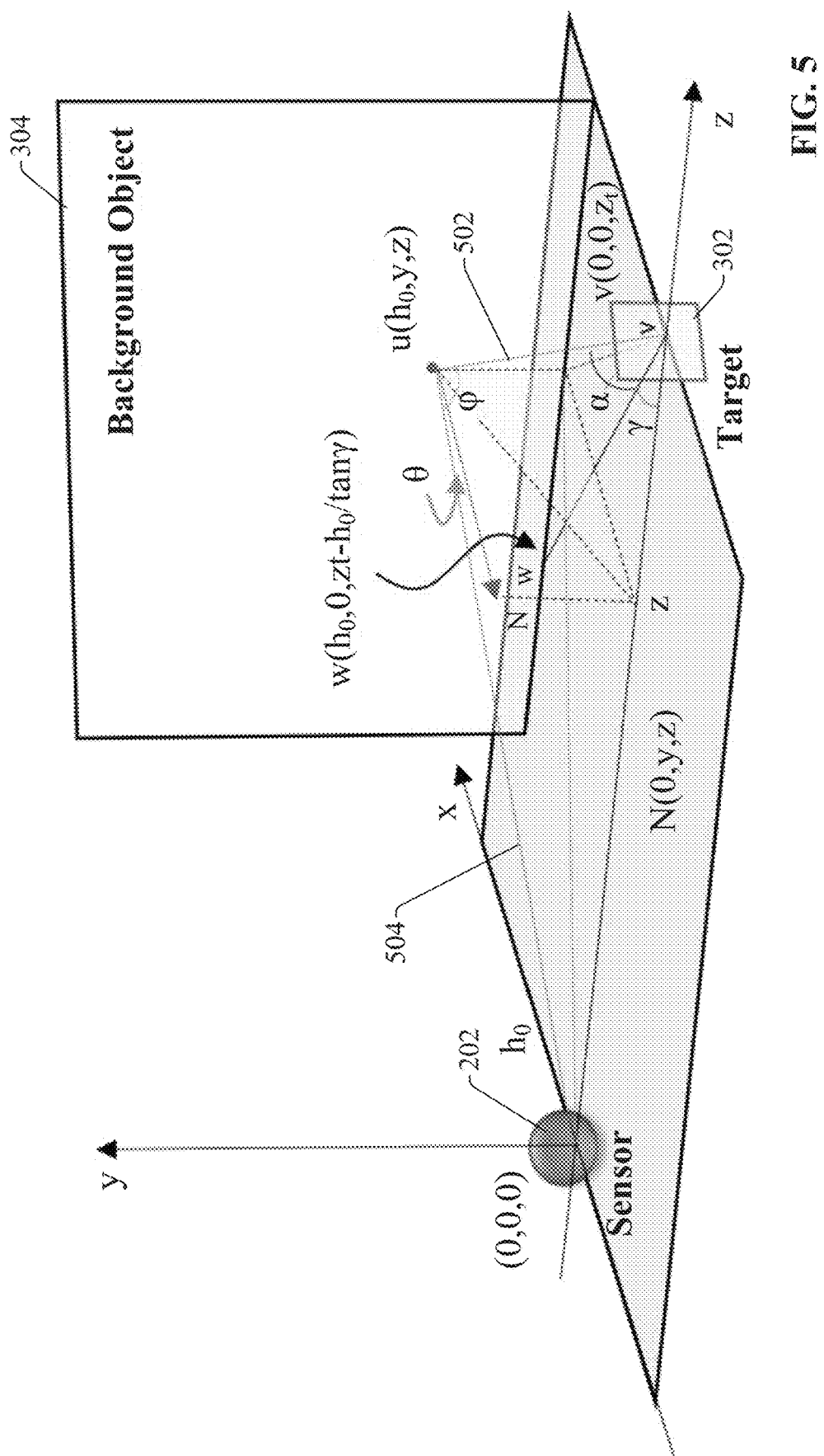
FIG. 5 is a schematic representing geometries of an example arrangement of a TOF sensor, a target object, and a background object.

FIG. 5 is a schematic representing geometries of an example arrangement of a TOF sensor 202, a target object 302, and a background object 304. TOF sensor 202 is assumed to reside at the origin (0,0,0) of a three-dimensional coordinate system. In this example, background object 304 is a flat surface (e.g., a wall or other fixed surface) that resides in a plane parallel to the z-y plane at a distance $h_0$ from the optical axis of the sensor (where the optical axis corresponds to the z-axis in FIG. 5). Target object 302 is an object within the sensor's field of view whose distance is to be measured. Target object 302 receives both direct illumination from the sensor's emitter component 204 and secondary illumination 502 comprising a portion of the sensor's emitted light that reflects off of background object 304 and onto the target object 302. Although FIG. 5 depicts only one path of secondary illumination 502—from point u on background object 304—target object 302 will typically receive secondary illumination from an array of points across the surface of the background object 304 within the sensor's field of illumination. Illumination from the TOF sensor's emitter component 204 can be measured in terms of irradiance in watts per square meter (w/m²). The elementary irradiance $dI_2$ from secondary illumination incident on point v on the target object 302 from a point source u on the background object 304 can be formulated as a function of the coordinates of both points u and v, the irradiance Iw(u) from the sensor's illumination onto the background object 304, and the orientation of the target object 302, as given by:

$$dI_2(u,v) = F(\gamma, x, y, z, x_t, y_t, z_t, \rho_w(u)) d_y d_z \quad (2)$$

where x, y, and z are the coordinates of point u, with $x = h_0$ in the example illustrated in FIG. 5 ($h_0$ being the distance from the wall to the plane (y,z)), $x_t$, $y_t$, and $z_t$ are the coordinates of point v, with $x_t = y_t = 0$ in the illustrated example, $d_y d_z$ is the elementary area of the source point at u, $\rho_w$ is the reflectivity index of the background object 304 at point u, Iw(u) is the incoming illumination light irradiance from the TOF sensor 202 onto point u, and γ is the rotational angle of the target object 302 relative to the z-axis (that is, relative to the direct path between the TOF sensor 202 and the target object 302).

The elementary irradiance $dI_2$ is proportional to $\rho_w$ and Iw(u), as represented generally by:

$$dI_2(u,v) = G(h_0, \gamma, y, z, z_t) \cdot \rho_w(u) \cdot I_w(u) \cdot d_y d_z \quad (3)$$

or more specifically by:

$$dI_2(u, v) = \frac{2\rho_w(u)I_w(u)}{\pi \cos\gamma\, h_0^2} \cos\theta \cos^5\varphi \cos\alpha\; d_y d_z \quad (4)$$

or $$dI_2(u, v) = \frac{2\rho_w\, I_w(u)}{\pi \cos\gamma} \frac{1}{\sqrt{h_0^2 + y^2 + z^2}} \frac{h_0^4(h_0 \sin\gamma + (z_t - z)\cos\gamma)}{(h_0^2 + y^2 + (z_t - z)^2)^3} d_y d_z \quad (5)$$

where θ is the angle between the normal vector N to the surface of the background object 304 at point u and the incoming light 504 received at point u from the sensor's emitter component 204, φ is the angle between the normal vector N and the path of secondary illumination 502 from point source u to the target object 302, and α is the angle between the path of secondary illumination 502 received at point v and the normal w to the surface of the target object 302 at point v. Equations (3)-(5) assume a background object that is a flat vertical plane parallel with the y-z plane that is a distance $h_0$ (along the x-axis) away from the sensor's optical axis. However, in cases in which points on the background object are not all equally distant from the optical axis, h0 can be replaced with the x coordinate for the point u.

This elementary irradiance $dI_2$ received by the target object 302 from background object 304 is scattered back by the Lambertian surface of the target object 302. This light is collected by the imaging optics of TOF sensor 202 and projected onto a pixel corresponding to point v, and a number of electrons $dN_{e2}(I_2)$ are generated by the photo-sensor component 206 for the pixel in proportion to this secondary irradiance received at the pixel.

The number of electrons $dN_{e2}(I_2)$ generated for the pixel viewing point v due to secondary illumination sourced by point u of the background object 304 can be expressed as follows:

$$dN_{e2}(u,v)) = K(\text{pixel}) \cdot \rho_T \cdot dI_2(u,v) \quad (6)$$

where $\rho_T$ is the reflectivity index of the target object 302 at point v, and K is a conversion factor coefficient related to the pixel and the pulse light. Conversion factor K can be obtained via calibration or sensor characterization as required.

Every point source u on the surface of background object 304 similarly reflects secondary illumination via point v that generates electrons in the pixel's photo detector. The combination, or integration, of these electrons from all point sources u on the surface of background object 304 yields a secondary illumination signal of sufficient strength to alter the pulse demodulation process and potentially distort the distance measurement for that pixel. Ideally, the distance measurement for the pixel corresponding to point v on target object 302 should be based solely on the electrons generated by pulses received via the direct illumination path between the sensor 202 and point v on the target object 302.

Figure 6A:
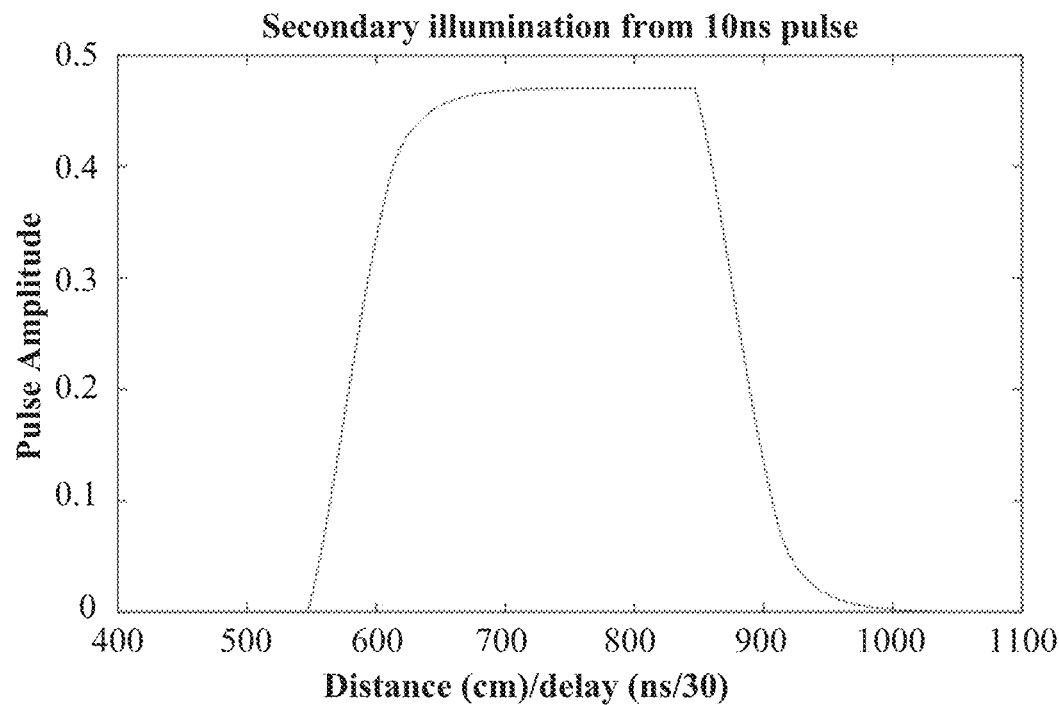
FIG. 6a is a graph plotting light intensity received at a pixel for a secondary pulse that travels from the emitter to a wall surface, then to a point v on a target, and back to the pixel when 10 nanosecond (ns) pulses are emitted by a TOF sensor's emitter component.
Figure 6B:
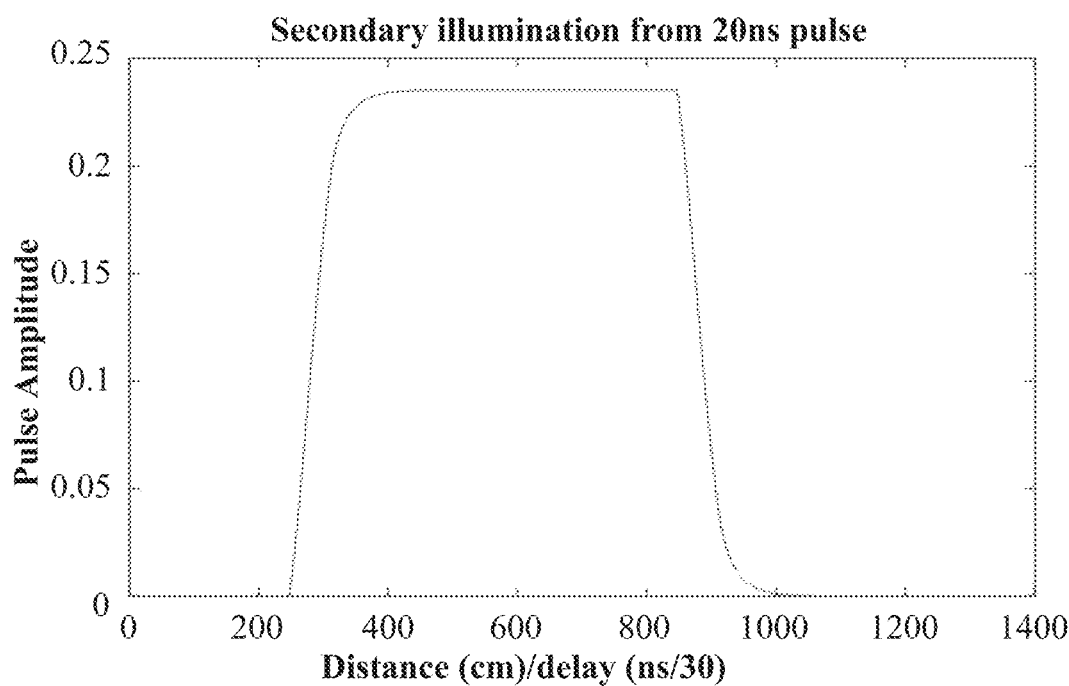
FIG. 6b is a graph plotting light intensity received at a pixel for a secondary pulse that travels from the emitter to a wall surface, then to a point v on a target, and back to the pixel when a 20 ns pulse is emitted.

Some embodiments of TOF sensor can emit the illumination signal as a burst of pulses and calculate the distance of target object 302 based on measurement of the timing of these pulses. The combination of secondary (or indirect) illumination paths at a given pixel of the TOF sensor's photo-sensor component 206 produces a measured pulse whose timing and shape is dependent upon the characteristics of the background object 304 and the target object 302. FIGS. 6a and 6b are graphs plotting light intensity received at a pixel for a secondary pulse that travels from the emitter to a wall surface, then to a point v on a target and back to the pixel. FIG. 6a is a graph plotting an example secondary pulse measurement when 10 nanosecond (ns) pulses are emitted by the TOF sensor's emitter component 204, and FIG. 6b is a graph plotting an example secondary pulse measurement when a 20 ns pulse is emitted.

Figure 7A:
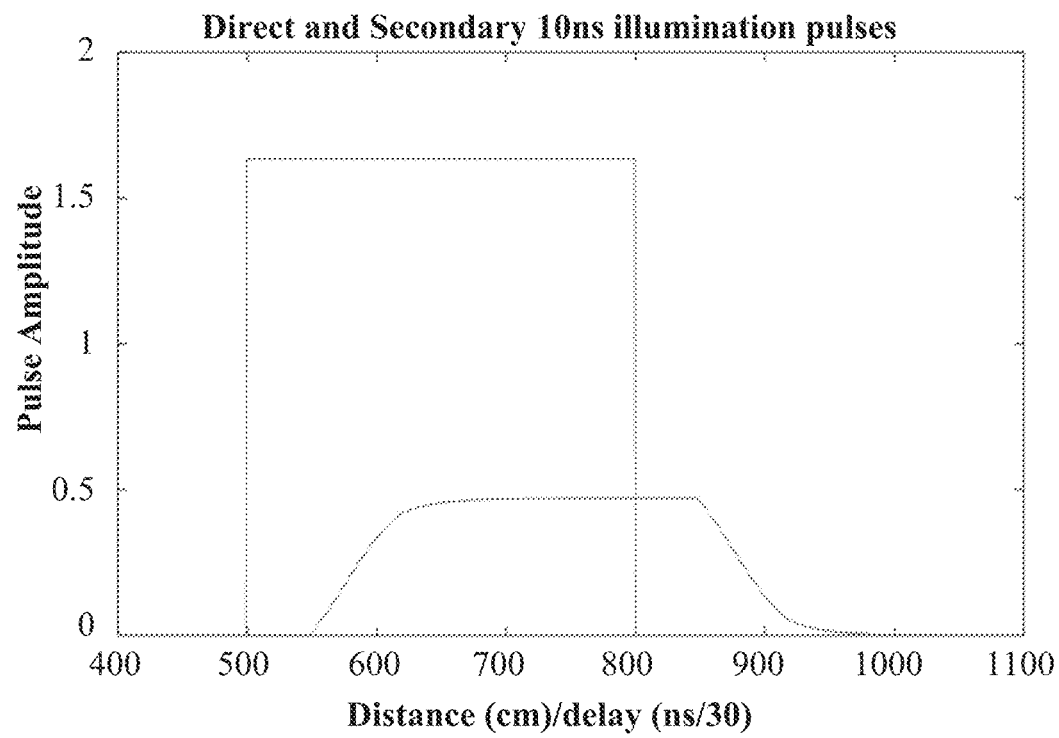
FIG. 7a is a graph plotting a measurement, at a pixel, of a secondary pulse due to secondary illumination paths together with a pulse from a direct illumination path to a target object for a 10 ns pulse.
Figure 7B:
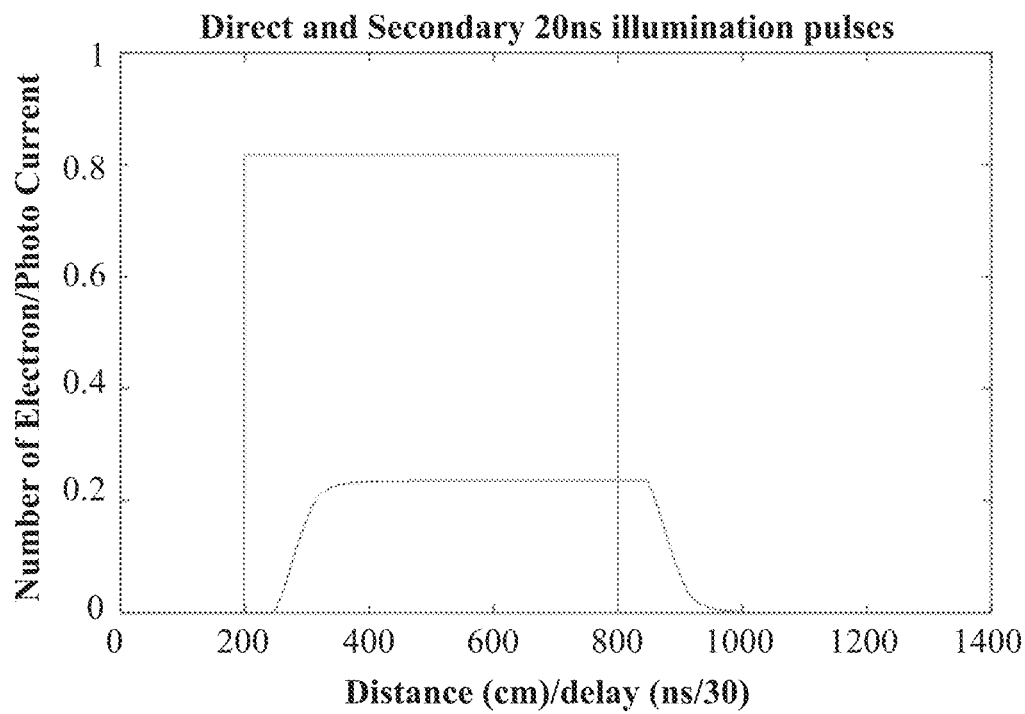
FIG. 7b is a graph plotting a measured secondary pulse due to secondary illumination paths together with a pulse measured from a direct illumination path to a target object for a 20 ns pulse.
Figure 8A:
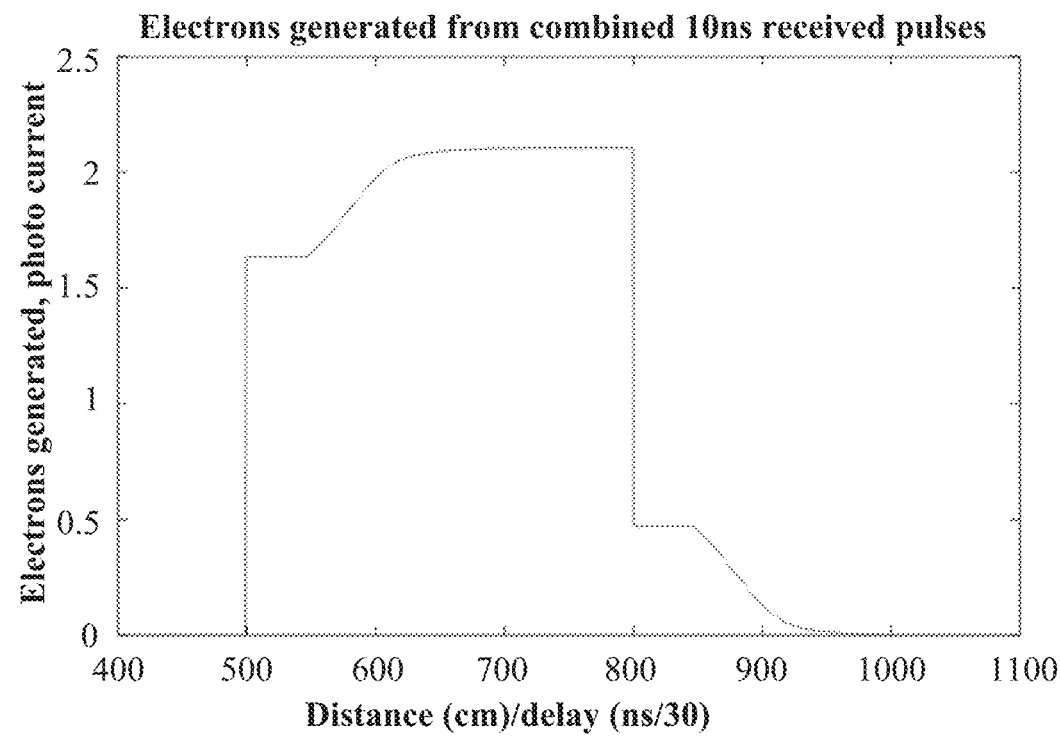
FIG. 8a is a graph depicting the combined signal received at a pixel as a result of both direct illumination pulses and secondary illumination pulses for 10 ns pulses.
Figure 8B:
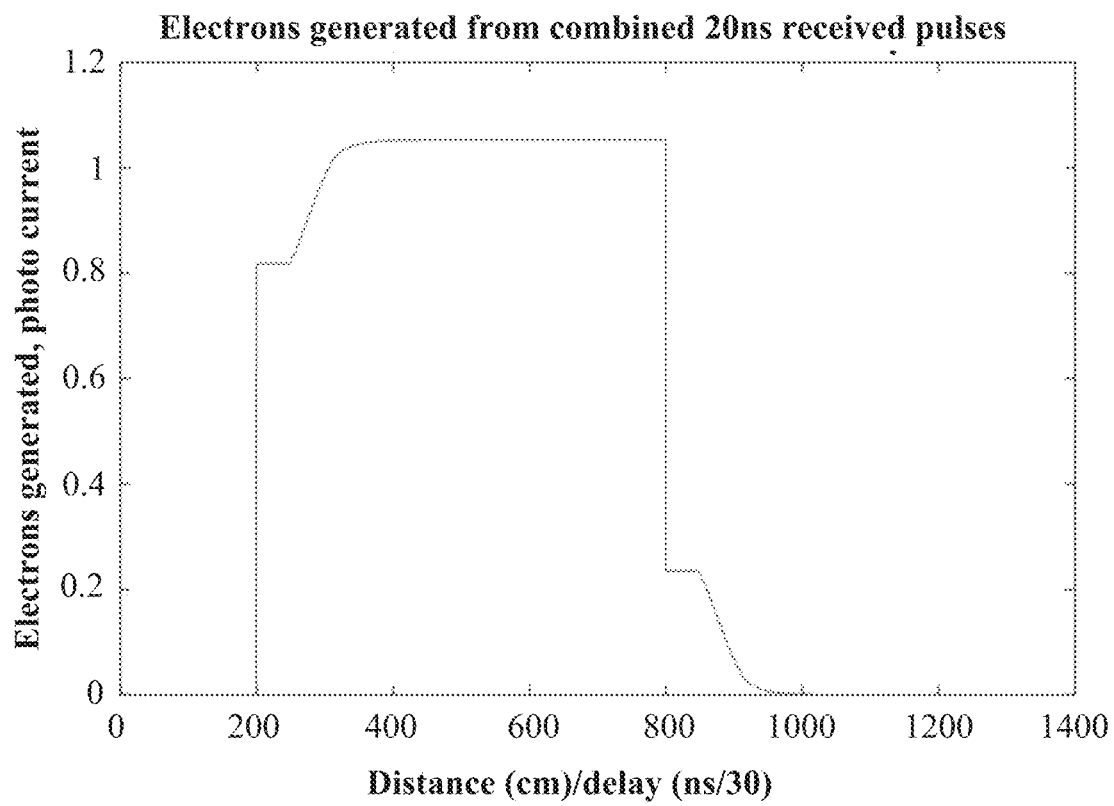
FIG. 8b is a graph depicting the combined signal received by a pixel as a result of both direct illumination pulses and secondary illumination pulses for 20 ns pulses

The timing and shape of the secondary illumination pulse received by the pixel defines the secondary pulse's impact on the distance measurement and the corresponding correction that the TOF sensor 202 will apply to the pixel to mitigate this impact. FIGS. 7a and 7b are graphs that plot the measured secondary pulse due to secondary illumination paths together with the pulse measured from the direct illumination path to the target object 302 for 10 ns pulses and 20 ns pulses, respectively. FIGS. 8a and 8b are graphs depicting the combined signal measured by the pixel as a result of both direct illumination pulses and secondary illumination pulses for 10 ns pulses and a 20 ns pulses, respectively. As shown in FIGS. 8a and 8b, multipath interference due to the integration of secondary illumination at the pixel yields a distorted pulse. If the distortions due to secondary illumination are not corrected, the direct illumination pulse may not be properly demodulated, and consequently the resulting distance measurement may not be accurate.

Embodiments of the TOF sensor 202 can predict the distance error due to MPII and correct for the error based on the prediction. To this end, TOF sensor 202 can measures the monitored environment and identify possible sources of MPII (e.g., background objects 304). Multi-pixel TOF sensors 202 are capable of viewing all objects located in the sensor's field of illumination and field of view simultaneously. Based on characteristics of these objects, TOF sensor 202 can identify a target object 302 for which a distance is to be measured (e.g., an object or person that intrudes within the TOF sensor's field of view and is not a part of the fixed background of the monitored scene), and can also identify which other objects may be potential sources of secondary illumination for the target object 302.

Figure 9:
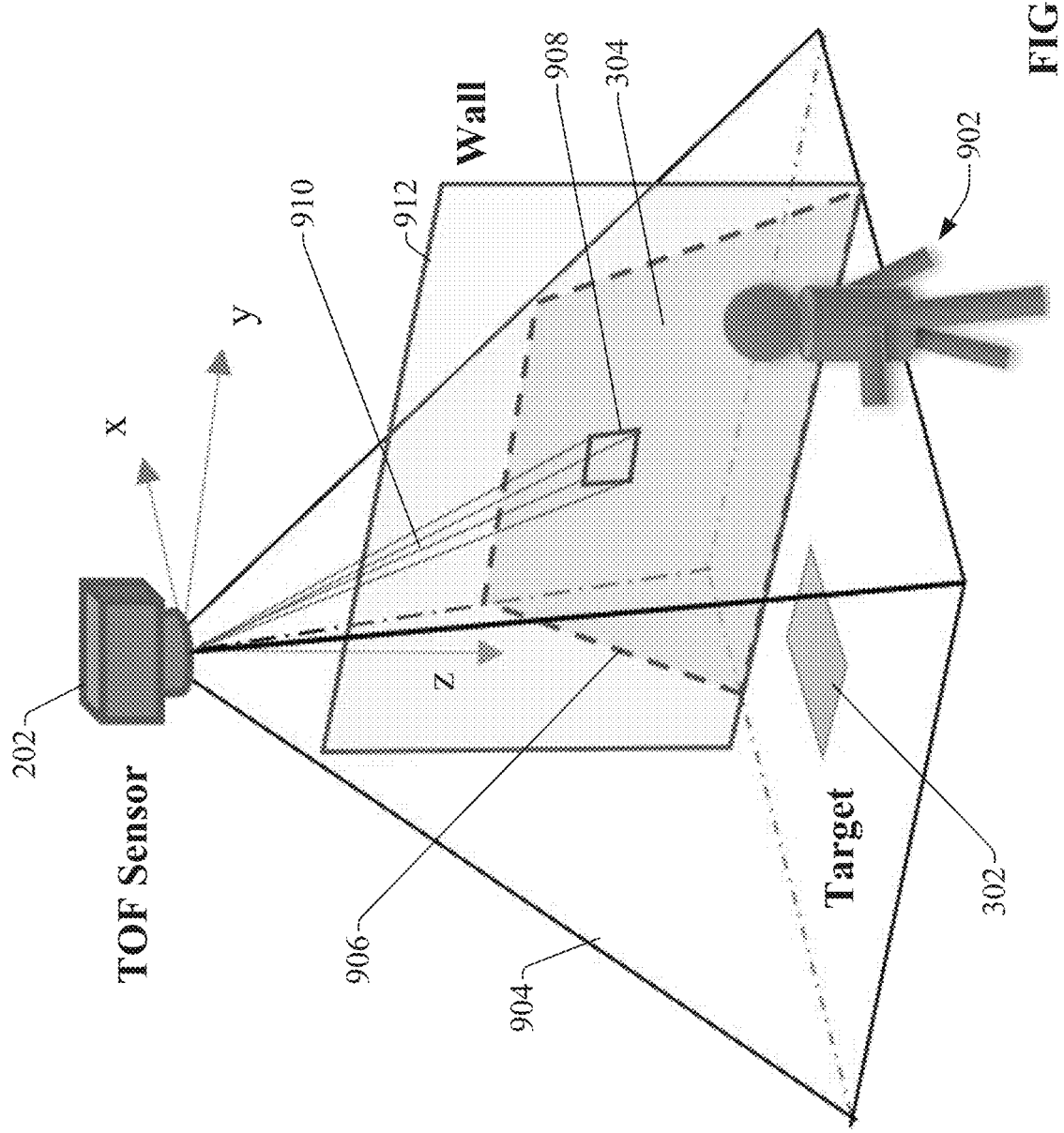
FIG. 9 is a diagram illustrating a simplified safety monitoring scenario in which a TOF sensor is mounted and oriented to face downward vertically to monitor a three-dimensional volume.

The technique implemented by embodiments of TOF sensor 202 for estimating multi-path illumination interference in terms of secondary irradiance onto a target object, and subsequently estimating and correcting for the induced effect on the distance measurement accuracy, is now described. Estimation and correction of MPII can be implemented by the TOF sensor's multipath correction component 210 in coordination with the photo-sensor component 206 and distance determination component 208. FIG. 9 is a diagram illustrating a simplified safety monitoring scenario in which a TOF sensor 202 is mounted and oriented to face downward vertically to monitor a three-dimensional volume (e.g., a hazardous industrial area). TOF sensor 202 projects a pyramidal field of illumination 904 and monitors a field of view that substantially corresponds to the field of illumination 904. This arrangement is intended to detect the presence of humans 902 or other intrusive objects (such as target object 302) and initiate a safety action in response to detection of an intrusion. In this example, background a wall 912 intersects the field of illumination 904. The segment of the wall 912 defined by dashed line 906 is the portion of the wall 912 that resides within the field of illumination 904 of the TOF sensor 202. This segment of the wall 912 acts as a background object 304 that may produce secondary illumination paths relative to a target object 302. The wall 912 is considered a Lambertian surface.

Background object 304 (in this example, the portion of wall 912 within the sensor's field of view) can be conceptually divided into a set of elementary point sources 908 (also referred to as point sources). In some embodiments, TOF sensor 202 may define these elementary point sources 908 using a grid or sub-grid defined as a projection of the pixel grid from the sensor array onto the surface of the background object 304. Each elementary point source 908 on the background object 304 reflects light pulses onto the target object 302 (as illustrated in FIGS. 4 and 5). This light from all of the wall's elementary point source 908 is scattered back from the target object 302, and some of this scattered light is collected by the sensor's imaging system and projected onto the corresponding pixels of the photo-sensor component 206. Each pulse received by a pixel from a corresponding point v on the target object 302 is characterized by a received irradiance and a propagation delay (assuming a substantially square or rectangular pulse). As noted above, these light pulses from indirect (or secondary) illumination paths, when combined together, are equivalent to a wider and stronger pulse of sufficient signal level to alter the pulse demodulation process at the sensor 202, and to distort the resulting measurement of the distance of the target object 302 from the sensor 202 (see, e.g., FIGS. 8a and 8b).

The process carried out by embodiments of TOF sensor 202 for predicting and correcting for MPII error is divided into four general steps. The first step is to identify and localize potential sources for secondary (indirect) illumination paths (see FIG. 10). The second step is to model and quantify those identified sources (see FIG. 12). The third step is to predict the impact of those sources on the target object 302 and predict the profile and delay of reflected secondary light pulses sent back to the TOF sensor 202 (see FIG. 16). The fourth step is to estimate the error induced in the distance measurements to the target object 302 and correct this error to the degree possible (see FIG. 17). In some embodiments, TOF sensor 202 can execute and apply this distance correction and prediction process as an iterative process as needed. In some embodiments, the sequence of background object identification and characterization, secondary pulse estimation, and distance correction can be applied for each measuring cycle carried out by the TOF sensor 202. In other embodiments, TOF sensor 202 may be configured to initiate the correction sequence only in response to detection of a target object 302 that has intruded into the sensor's field of view, necessitating a distance measurement and corresponding correction of multipath interference. In these latter embodiments, TOF sensor 202 may execute MPH estimation and correction as long as the target object 302 is detected anywhere within the TOF sensor's field of view.

Figure 10:
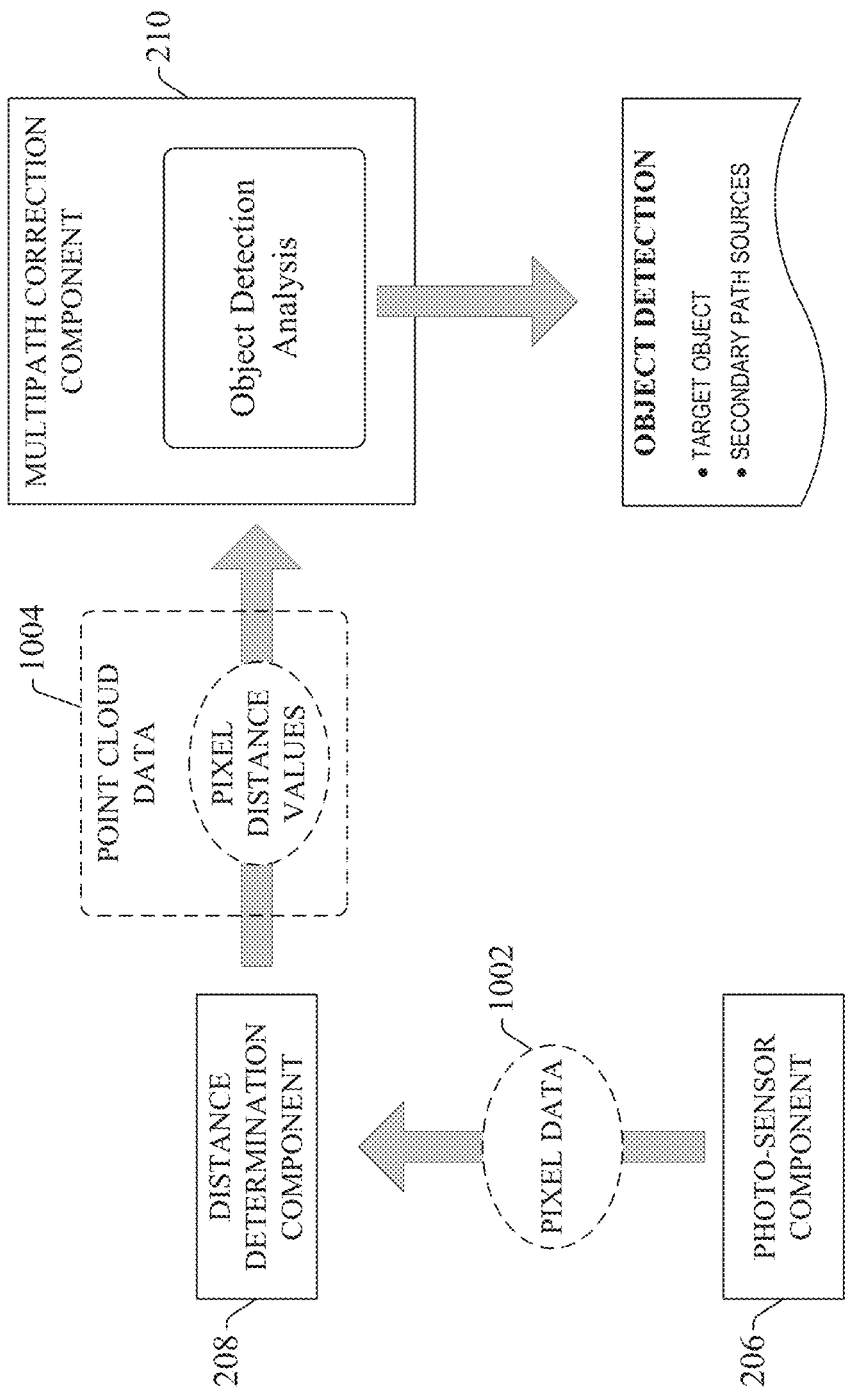
FIG. 10 is a block diagram illustrating generalized data flows carried out by components of a TOF sensor to identify objects within a monitored scene.

FIG. 10 is a block diagram illustrating generalized data flows carried out by components of the TOF sensor 202 to identify objects within the monitored scene. With at least one target object 302 and at least one background object 304 within the sensor's field of view, TOF sensor 202 performs an initial distance measurement on the monitored scene. That is, the TOF sensor's emitter component 204 emits pulsed light illumination into the scene, and the photo-sensor component 206 receives pulses reflected from objects and surfaces within the scene. The TOF sensor's optical elements direct these received pulses to a photo-receiver array associated with photo-sensor component 206, which generates pixel data 1002 for the scene. Depending on the type of TOF sensor, pixel data 1002 may comprise individual voltage measurements generated for each pixel (or a set of two or more voltage measurements for each pixel representing sampled portions of a received pulse, as well as ambient light in some embodiments) as a function of the amplitude and timing of the pulses received at that pixel. The pixel data 1002 is then provided to distance determination component 208, which computes distance values for each pixel based on the pixel data 712, resulting in point cloud data 1004 comprising an array of distance values corresponding to the respective pixels of the field of view. Since this is assumed to be the first measurement taken for the scene after target object 302 has entered the field of view, the resulting distance values that make up point cloud data 1004 may contain errors due to uncorrected MPII from background object 304 (in this example, from the portion of wall 912 that intersects the sensor's field of illumination). These errors may cause objects within the scene to yield larger measured distances than their actual distances from the TOF sensor 202.

Figure 11:
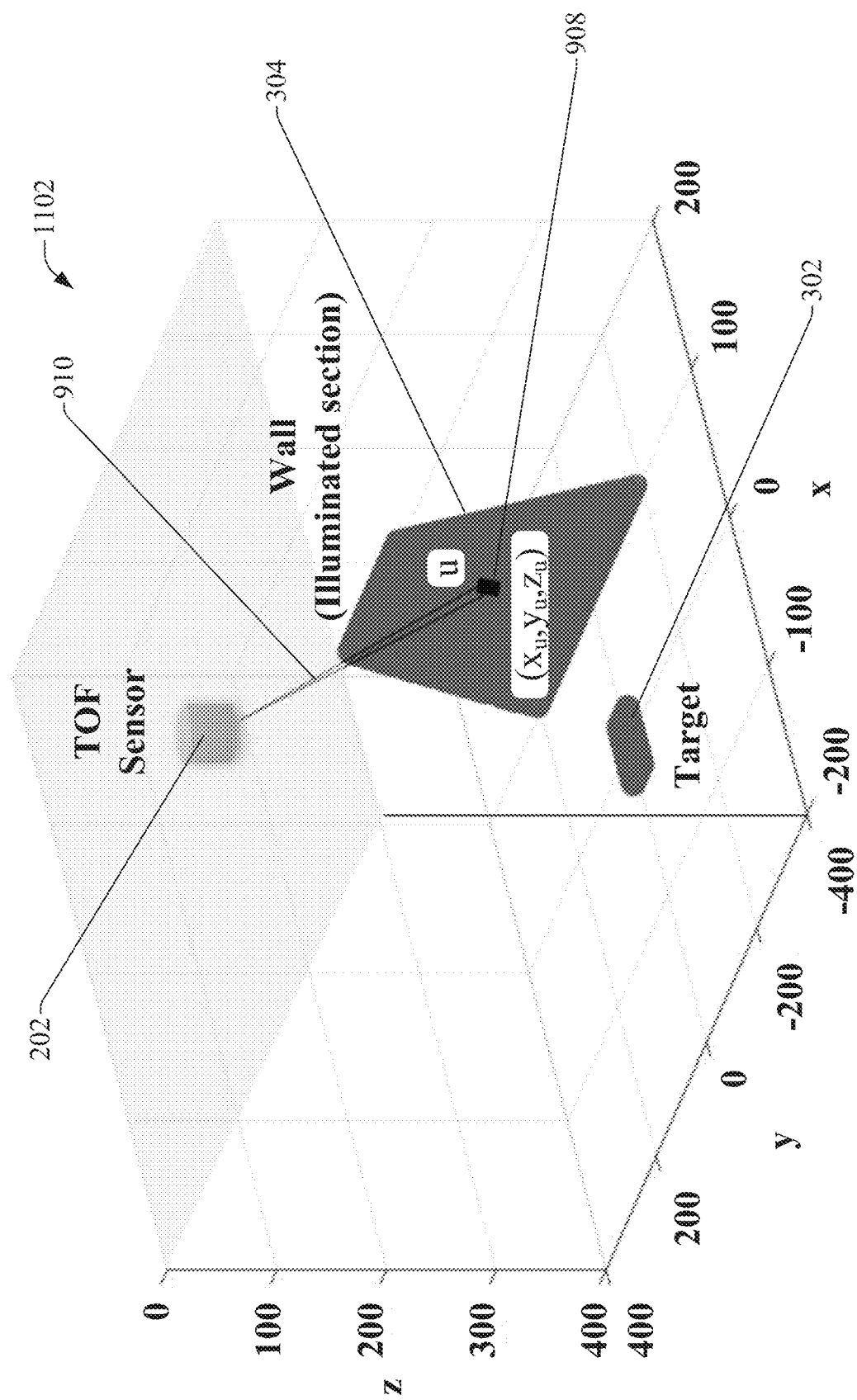
FIG. 11 is a representation of an example point cloud image generated by a TOF sensor based on an initial distance measuring sequence.

FIG. 11 is a representation of an example point cloud image 1102 of the scene depicted in FIG. 9 generated by TOF sensor 202 based on this initial distance measuring sequence. The point cloud image 1102 comprises a three-dimensional grid representing the monitored scene, within which representations of the target object 302 and the target object 302 (the portion of the wall 912 within the sensor's field of illumination 904) are defined based on the distance values (point cloud data 1004) generated by the sensor's pixel array during this initial measurement. Once this point cloud image 1102 is generated, the sensor's multipath correction component 210 can perform object detection analysis on the point cloud image 1102 to identify the target object 302 and one or more background objects 304 within the point cloud image 1102. That is, based on the object detection analysis performed on the point cloud image 1102, the multipath correction component 210 can identify which pixels of the sensor's pixel array have within their field of view either the target object 302 or the background object 304 (as well as other potential sources of a secondary light path relative to the target object 302). The distances of respective points on the surfaces of the target object 302 and the background object 304 from the TOF sensor 202 are also identified based on the pixel distance values.

Any suitable type of analysis can be applied to the point cloud image 1102 to identify and classify the target object 302 and background object 304, including but not limited to three-dimensional shape analysis, edge detection, or other such techniques. Embodiments of the TOF sensor 202 that perform background monitoring may pre-identify background objects 304 within the field of view as elements of the background, while identifying objects that subsequently enter the field of view and mask portions of the monitored background as target objects 302.

Figure 12:
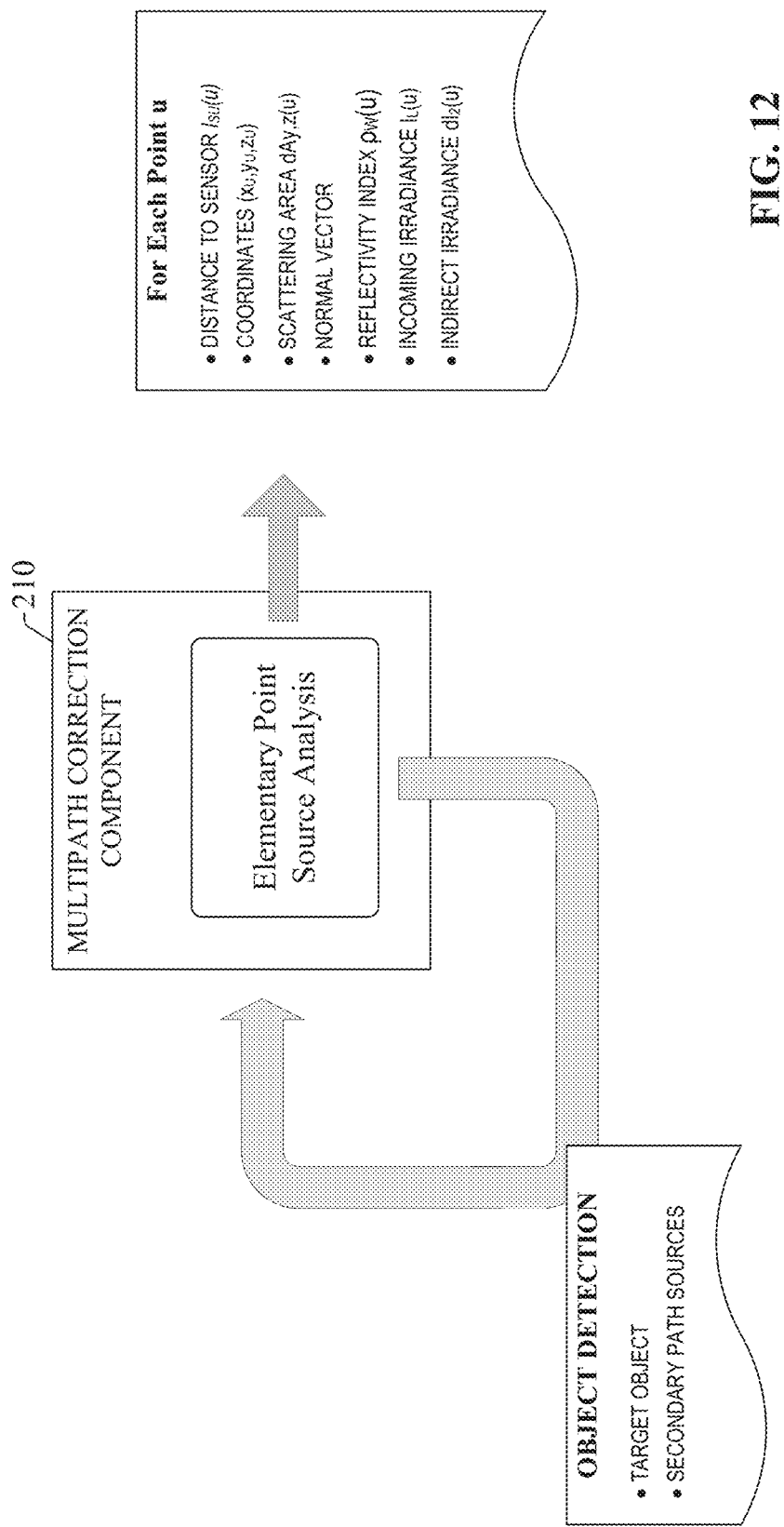
FIG. 12 is a block diagram illustrating performance of elementary point source analysis by a TOF sensor's multipath correction component.

Once the target object 302 and one or more background objects 304 have been identified, the TOF sensor 202 models and quantifies the identified background objects 304 using elementary point source analysis. FIG. 12 is a block diagram illustrating performance of elementary point source analysis by the TOF sensor's multipath correction component 210. According to this second step, the multipath correction component 210 models the background object 304 as an array of points u (also referred to as elementary point sources) representing individual sources of secondary illumination relative to target object 302, and determines a set of properties or parameters for each point u that characterize the point. These properties will be used to characterize the total amount of secondary illumination provided by the background object 304 and seen by a pixel corresponding to a point v on the target object 302.

Multipath correction component 210 generates model data that models illumination light reflected from the background object 304 toward the target object 302 as a set of elementary point sources 908 based on the measurements of the background object 304 collected by the TOF sensor 202 and the point cloud image 1102. To this end, after the target object 302 and background object 304 have been identified, multipath correction component 210 can divide the background object 304 into elementary point sources 908 according to a predefined grid; e.g., by imposing the grid over the surface area of the background object 304 and designating each element of the grid as an elementary point source 908 to yield an array of point sources 908 across the surface of the background object 304. Although only one elementary point source 908 is depicted in FIG. 11 for clarity, multipath correction component 210 will typically model the entire surface of the background object 304 as an array of elementary point sources 908. Although described as a "point," each elementary point source 908 will typically be defined as a small two-dimensional area.

The grid used by the multipath correction component 210 to define the elementary point sources 908 can be generated using any suitable technique. In an example embodiment, each elementary point source 908 can correspond to one pixel representing a point u on the surface of the background 304. In such embodiments, the grid used to define the array of elementary point sources 908 can be based on a modeled projection of the sensor's pixel array grid through the imaging optics onto the model of the background object 304, with each grid point on the modeled background object 304 being the intersection of the center axis of a pixel's field of view 910 with the surface of the background object 304.

Figure 13:
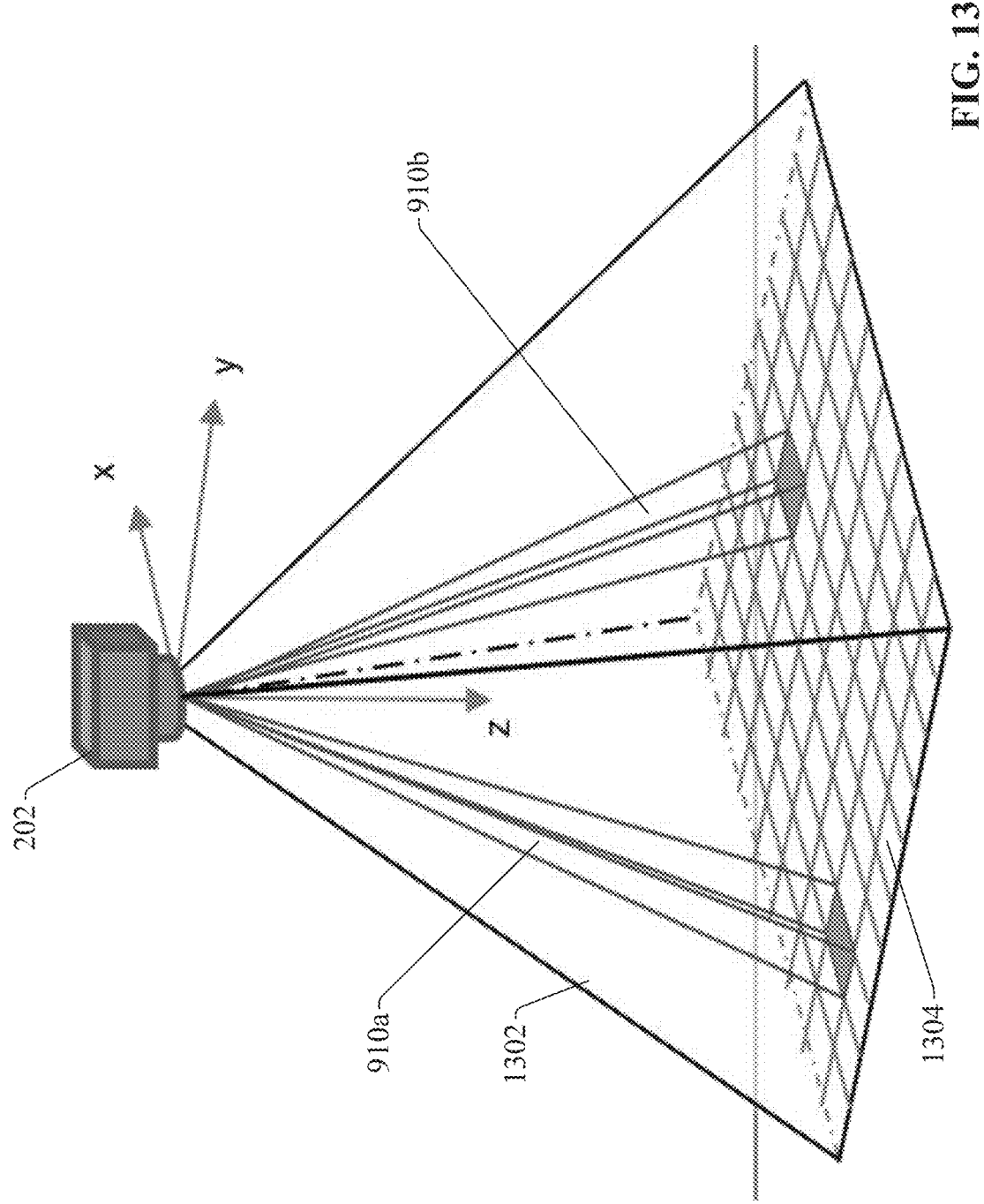
FIG. 13 is a diagram illustrating projections of fields of view of a pixels of a sensor.

Projection of a pixel's field of view is discussed in more detail in connection with FIGS. 13-15. FIG. 13 is a diagram illustrating projections of the fields of view of the pixels of sensor 202. In general, the total field of view 1302 of sensor 202 can be modeled as rectangular right pyramid (in this example, the sensor's field of view 1302 substantially corresponds to the sensor's field of illumination 904, though this may not always be the case; for example, the field of view 1302 may be equal to or wider than the field of illumination 904). The z-axis is the optical symmetry axis of the sensor 202, representing the center of the imaging field of view. The x-y plane as defined in FIG. 13 is parallel to the sensor pixel array.

The sensor field of view 1302 can be divided into smaller oblique pyramids associated with each of the individual pixels' fields of view 910 (for clarity, only two pixel field of views 910a and 910b are delineated in FIG. 13). In the scenario depicted in FIG. 13, the pixel fields of view 910 intersect with a plane that is parallel to the x-y plane.

Figure 14:
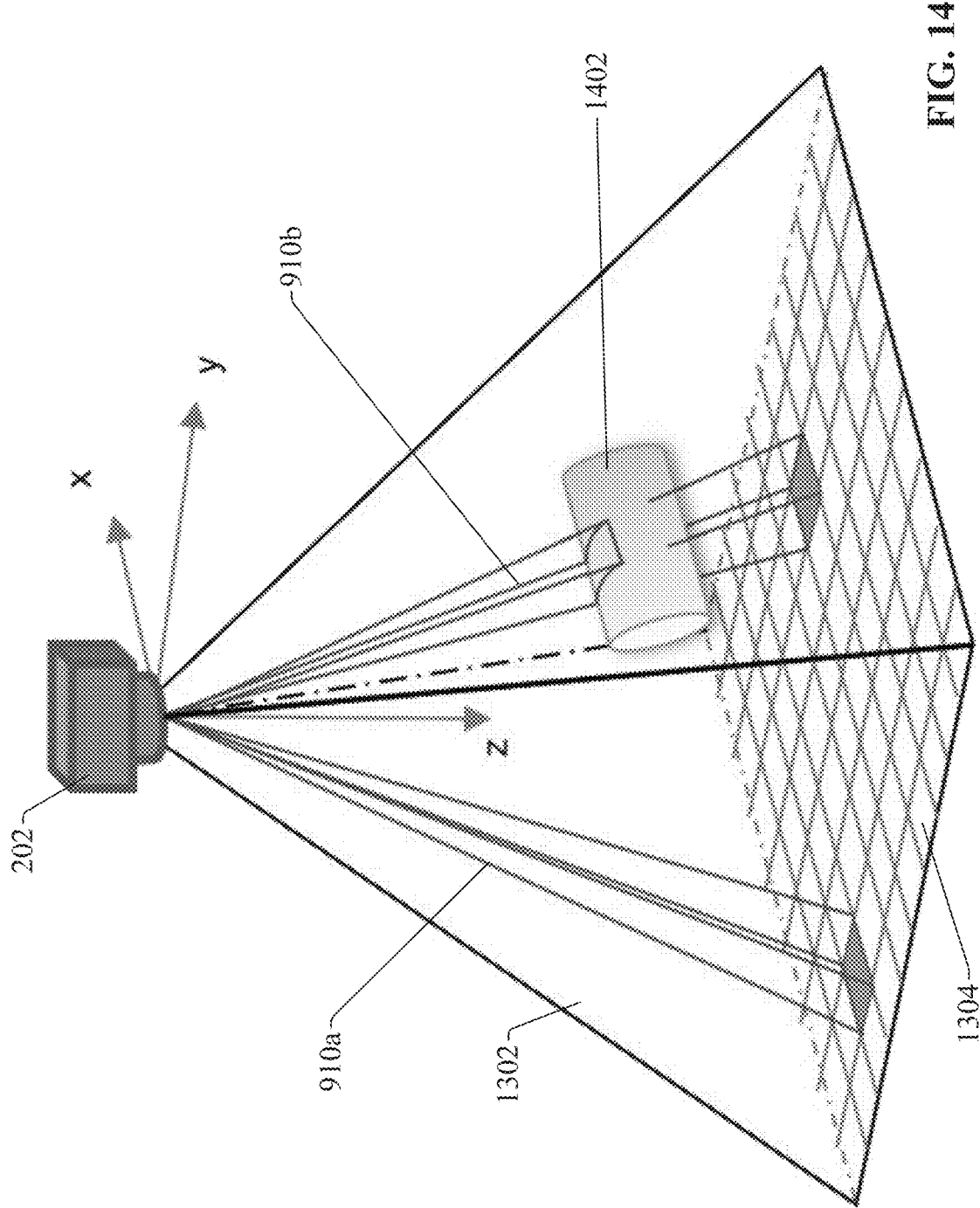
FIG. 14 is a diagram illustrating intersection of a pixel's field of view with an object within a sensor's field of view.

FIG. 14 is a diagram illustrating intersection of a pixel's field of view 910b with an object 1402 within the sensor's field of view 1302. Each individual pixel of the sensor's pixel array is capable of measuring the distance to an object 1402 intersecting its field of view. The pixel is also capable of measuring the intensity of the light reflected back from the object 1402. The amount of light reflected back from the object 1402 depends on the reflectivity index of the object's surface.

Figure 15:
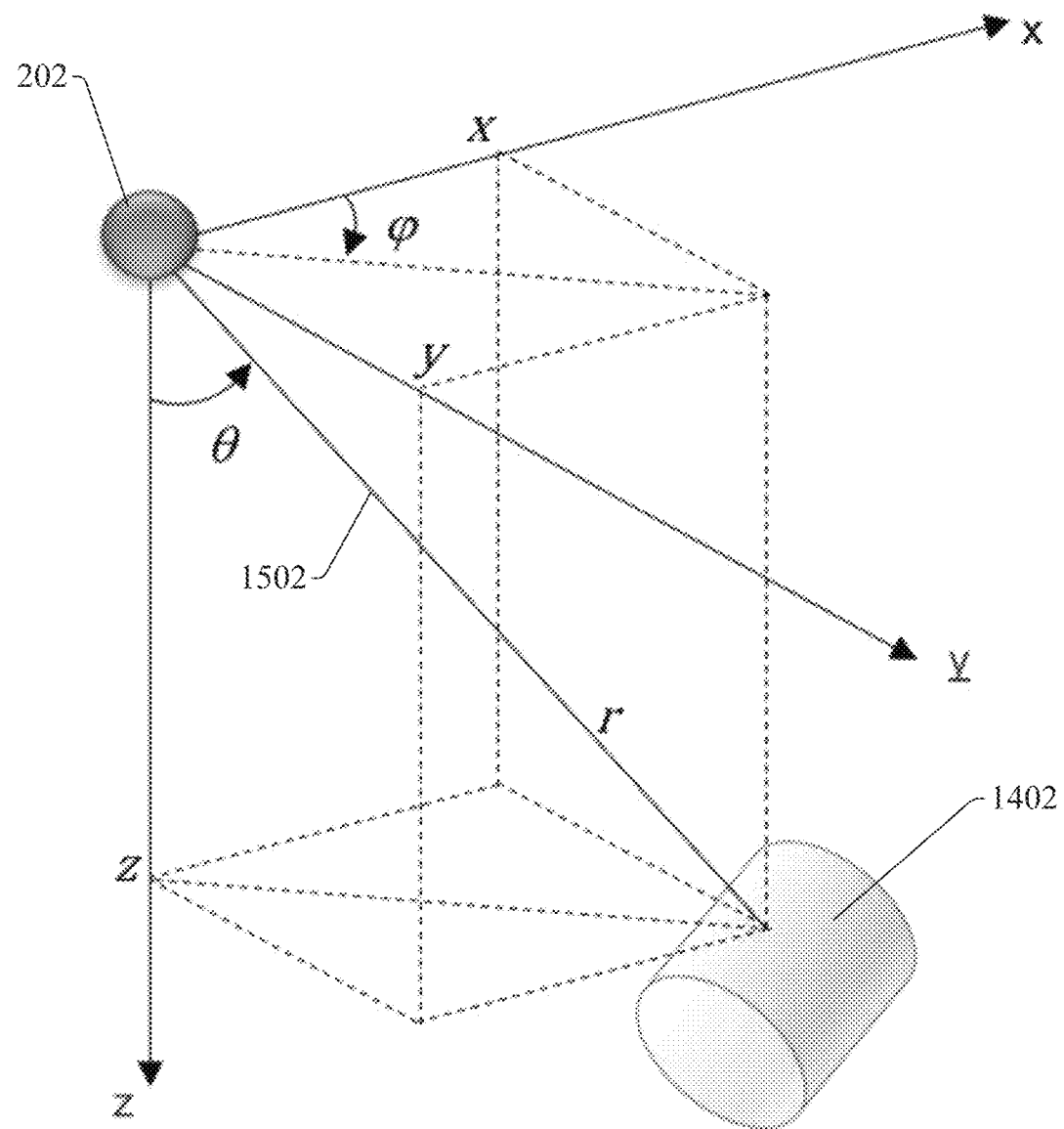
FIG. 15 is a diagram illustrating construction of the spherical and Cartesian coordinates for a given pixel of a sensor relative to an object within the pixel's field of view.

FIG. 15 is a diagram illustrating construction of the spherical and Cartesian coordinates for a given pixel of sensor 202 relative to an object 1402 within the pixel's field of view. Each pixel field of view 910 can be described by an angle ($\theta$, $\varphi$) (in spherical coordinates) of its axis of symmetry 1502, where $\theta$ is the angle of the axis of symmetry 1502 relative to the z axis and $\varphi$ is the angle of the axis of symmetry 1502 relative to the x axis. The spherical coordinates of a point on object 1402 viewed by the pixel is (r, $\theta$, $\varphi$), where r is the distance of the object point from the sensor 202 as measured by the pixel. The Cartesian coordinates of that point are (x, y, z), which can be obtained from the spherical coordinates according to:

$$x = r \sin \theta \cos \varphi \quad (7)$$

$$y = r \sin \theta \sin \varphi \quad (8)$$

$$z = r \cos \theta \quad (9)$$

Although the intersection of the pixel's field of view 910 with the object 1402 is a section of the object surface, that intersection can be represented by point u and its coordinates (x, y, z).

In a pixel array, each pixel is typically identified by indices (i,j), such that a given pixel is identified as p(i,j) or $p_{ij}$, where i and j represent the horizontal and vertical position, respectively, of the pixel within the pixel array. A given pixel p(i,j) is associated with two angles ($\theta_{ij}$, $\varphi_{ij}$) that define the direction or center axis of that pixel's field of view. The value of these two angles are obtained either from design parameters or from measurement and calibration of the sensor 202.

Returning now to FIG. 11, the multipath correction component 210 can designate the elementary point sources 908 by projecting the TOF sensor's pixel array onto an x-y plane at maximum range, such that the pixel array is represented in that plane by a grid or array whose each point is associated with a pixel of the sensor 202. For each pixel (that is, each element of the projected grid), the multipath correction component 210 determines if there is an object in the pixel's field of view (e.g., field of view 910), indicating that there is a point in space seen by the pixel that corresponds to an object coordinate (x, y, z) on the radial line segment from the sensor 202 to the grid point corresponding to the pixel. For clarity, FIG. 11 depicts only one grid element projection; namely, that elementary point source 908 corresponding to the field of view 910 of one pixel. However, the projections of the fields of view of multiple pixels having the background object 304 within their FOV will collectively define an array or grid of multiple elementary point sources 908 across the surface area of the background object 304. In some embodiments, the projected grid used by the TOF sensor 202 to define the elementary point sources 908 can be adjusted to be finer or coarser in order to meet the specific needs of the product and applications.

For each elementary point source 908 on each background object 304 within the field of view, TOF sensor 202 can estimate the indirect secondary illumination received at the target object 302 from that elementary point source 908 and measured at the corresponding pixel of the TOF sensor 202. After the elementary point sources 908 have been defined for the background object based on analysis of the point cloud image 1102 as described above, the multipath correction component 210 estimates or otherwise determines characteristics of each elementary point source 908 independently. Characteristics that can be determined for each elementary point source 908 can include, but are not limited to, the distance of the elementary point source 908 from the TOF sensor 202 (which can be determined from the point cloud data 1004, as generated by the distance determination component 208 using time-of-flight techniques), the three-dimensional point coordinates u($x_u, y_u, z_u$) of the point source 908 within the coordinate system of the point cloud image 1102, the scattering area $dA_{x,y}(u)$ of the point source 908 (which can be determined as the size of the intersection of the corresponding pixel's field of view projection with the surface of background object 304), the normal vector of the surface of the background object 304 at the point source 908, the product of the reflectivity index $\rho_w(u)$ of the point source 908 and the incoming irradiance $I_L(u)$ received at the point source 908 (which can be determined based on the number of electrons $dN_{e2}(I_2)$ generated by the pixel having point source 908 within its field of view and the coefficient K of the pixel using, for example, equation (6)), and the indirect irradiance $dI_2(u, v)$ directed to point v from each of the elementary point sources 908.

According to the general MPII correction technique implemented by TOF sensor 202, for each pixel corresponding to a point v on the target object 302, multipath correction component 210 determines the indirect irradiance $dI_2(u, v)$ directed to point v from each of the elementary point sources 908, then sums the resulting indirect irradiances $dI_2(u, v)$ from all the elementary point sources 908 to estimate the total indirect irradiance $I_2(v)$ received by the pixel (that is, the pixel having point v of the target object 302 in its field of view). The indirect irradiances from all elementary point sources can be calculated, for example, based on any of equations (3)-(5), or another suitable formula, as will be described in more detail below. Based on this total indirect irradiance, the multipath correction component 210 estimates the indirect light pulse (e.g., the pulses exemplified by those depicted in FIGS. 6a and 6b) and associated photo current or electrons generated by the pixel corresponding to point v as a result of secondary illumination from background object 304. This information will be used to estimate the error in electrons being measured at the pixel and correct the corresponding distance measurement and calculation for the pixel. A pixel looking at a point u on the background 304 can generate information used by the multipath correction component 210 to determine the key parameters of the elementary point source 908 discussed above. Consequently, the MPII estimation and correction technique applied by TOF sensor 202 does not require a priori knowledge of the background object's characteristics, such as reflectivity index, size, shape, position, or orientation.

A pixel p(i,j) looking at a specific point source u on the background object 304 receives pulse light from the associated area $dA_{y,z}(u)$ of the point source, and the pixel generates and captures electrons proportional to the amplitude and duration of this light pulse. As discussed above in connection with FIGS. 13-15, point u—corresponding to elementary point source 908—is defined as the intersection of the background object's surface with the pixel's field of view axis 1502 defined by the two angles ($\theta_{ij}, \varphi_{ij}$). The base sensing function of TOF sensor 202 is to measure the distance of the target object 302 present in the field of view of the pixel. Designating $\widetilde{l_{su}}(u)$ as the measured distance from the TOF sensor 202 to the point u on the background 304, if $\widetilde{l_{su}}(u)$ and the location (i,j) of the pixel on the sensor array are known, multipath correction component 210 can calculate the point u coordinates ($x_u, y_u, z_u$) by simple geometry or trigonometry calculations. For example, the Cartesian coordinates of point u can be obtained from the measured distance $\widetilde{l_{su}}(u)$ and angles ($\theta_{ij}, \varphi_{ij}$) of the pixel according to:

$$x_u = \widetilde{l_{su}}(u) \sin\theta_{ij} \cos\varphi_{ij} \qquad (10)$$

$$y_u = \widetilde{l_{su}}(u) \sin\theta_{ij} \sin\varphi_{ij} \qquad (11)$$

$$z_u = \widetilde{l_{su}}(u) \cos\theta_{ij} \qquad (12)$$

Another geometric or trigonometric approach can also be used to obtain the Cartesian coordinates of point u. Alternatively, TOF sensor 202 may store a lookup table (e.g., a coordinate conversion table) that correlates $\widetilde{l_{su}}(u)$ and pixel location (or pixel identifier) with point u coordinates ($x_u, y_u, z_u$).

For embodiments in which pixel projections are used to define the elementary point sources 908 (as described above), the area $dA_{y,z}(u)$ on the background object 304 around point u is delimited by the field of view 910 of the pixel intersected by the surface of the background object 304; that is, the projection, through the imaging optics, of the pixel area onto the background object. This area is a function of the distance of the surface of the background object 304 from the pixel, with the cross-section of the pixel's field of view 910 becoming larger as the distance from the pixel increases. Accordingly, multipath correction component 210 can define and calculate this area $dA_{y,z}(u)$ based on the pixel identifier (indicating the location of the pixel within the TOF sensor's pixel array) and the measured distance $\widetilde{l_{su}}(u)$. In some embodiments, $dA_{y,z}(u)$ can be calculated, obtained from a stored table that defines, for each pixel, an area as a function of distance, or a combination of both calculation and a table look-up approach.

The distance measurement carried out by the TOF sensor 202 is made with a certain precision that may not be sufficient to calculate all necessary background object parameters. The precision and accuracy of the background object geometries and associated dimensions can be improved by applying any of a number of methods. According to one example approach, the distance from the TOF sensor 202 to the elementary point source 908 on the background object 304 can be measured across a longer range of time than the response time used to measure target objects 302. In another approach, points on the background object 304 closer to the sensor 202 can be measured with better accuracy due to higher signal to noise ratio, and the position of points further away can be inferred based on the measured positions of the points nearer the sensor 202. According to yet another approach, some characteristics of the background object surface may be taught or programmed into the TOF sensor 202 a priori. These taught characteristics can include, for example, the flatness of the surface, the radius of a curved portion of the surface, known reference points or angles on the surface, or other such characteristics indicative of the topology of the background object's surface.

The normal to the wall surface at point u can be calculated for a given pixel based on distance information collected by neighboring pixels. For example, distance information collected from a subset of pixels surrounding a pixel of interest (that is, the pixel corresponding to elementary point source 908) can collectively yield topology information for the section of the background object surface surrounding the elementary point source 908. Accordingly, the multipath correction component 210 can analyze the distance values for a selected subset of pixels within a defined proximity of the pixel of interest to determine the topology of the background object surface on which point u resides, and determine the normal vector to point u based on this surrounding topology. Precision of this calculation can be improved with known information about the shape of the surface (e.g., a flatness of the surface or the radius of curved portions of the surface).

A pixel looking at a point source u (elementary point source 908) on the background object 304 generates a number of electrons $N_e(u)$ captured by the measuring capacitors of the pixel, as characterized by:

$$N_e(u) = K(\text{pixel}) \cdot \rho_w(u) \cdot I_L(u) \tag{13}$$

The product $\rho_w(u) \cdot I_L(u)$ in equation (13) varies among pixels having the background object 304 within their field of view. TOF sensor 202 estimates this quantity $\rho_w(u) \cdot I_L(u)$ based on the measured strength of the signal received at the pixel having point u (elementary point source 908) within its field of view. If K is the conversion coefficient (which may be a pixel-dependent design parameter), then the product can be given by:

$$\rho_w(u) \cdot I_L(u) = \frac{N_e(u)}{K} \tag{14}$$

The measured value $\widetilde{N_e}(u)$ can be used as a measure of the light proportionality factor as previously defined in equation (3). The peak power of the indirect illumination pulse from point u on the background object 304 can be given as $$dP_{out}(u) = \rho_w(u) \cdot I_w(u) \cdot d_y d_z \tag{15}$$

where $I_w(u)$ is the incoming illumination at point u.

If $dA_{y,z}(u) = d_y d_z$ is the area of the elementary point source 908 viewed by the pixel corresponding to point u and θ is the angle between the normal N to the surface of the elementary point source 908 and the path of the incoming light 504 (as illustrated in FIG. 5), then the incoming light pulse power is given by:

$$dP_{in} = I_L(u) \cdot \cos\theta \cdot dA_{y,z}(u) \tag{16}$$

The incoming illumination light $I_w(u)$ is given by:

$$I_w(u) = I_L(u) \cos\theta \tag{17}$$

Replacing $I_w(u)$ in equation (15) with the right-hand side of equation (17), the outgoing power $dP_{out}$ scattered back from the same area is given by:

$$dP_{out} = \rho_w \cdot I_L \cdot \cos\theta\theta \cdot dA_{y,z}(u) \tag{18}$$

Since $$\rho_w \cdot I_L = \frac{\widetilde{N_e}(u)}{K} \tag{19}$$

then equation (18) can be rewritten as $$dP_{out} = \frac{\widetilde{N_e}(u)}{K} \cdot \cos\theta \cdot dA_{y,z}(u) \tag{20}$$

$N_e(u)$ is measured by the TOF sensor 202 itself based on the measured strength of signals received at the pixel having point u within its field of view. K is a known constant determined based on the product design parameters (and, in some embodiments, adjusted if necessary on a pixel-by-pixel basis through calibration or characterization).

An estimate of the elementary indirect (or secondary) irradiance $dI_2$ received by point v on the target object 302 from point u on the background object 304 can be given by:

$$d\tilde{I}_2(u) = \frac{1}{2\pi R^2} \cos\varphi \, dP_{out}(u) \tag{21}$$

$$d\tilde{I}_2(u) = \frac{\widetilde{N_e}(u)}{2\pi K R^2} \cos\theta \cos\varphi \cos\alpha \cdot dA_{y,z}(u) \tag{22}$$

$$d\tilde{I}_2(u) = \frac{2\widetilde{N_e}(u)}{\pi K h_0^2} \cos\theta \cos^5\varphi \cos\alpha \cdot dA_{y,z}(u) \tag{23}$$

where $$R = \frac{h_0}{2\cos^2\varphi} \tag{24}$$

$$R = \frac{h_0^2 + y^2 + (z_t - z)^2}{2 \cdot h_0} \tag{25}$$

$$\cos\varphi = \frac{h_0}{\sqrt{h_0^2 + y^2 + (z_t - z)^2}} \tag{26}$$

$$\cos\theta = \frac{h_0}{\sqrt{h_0^2 + y^2 + z^2}} \tag{27}$$

$$\cos\alpha = \frac{h_0 \sin\gamma + (z_t - z)\cos\gamma}{\sqrt{h_0^2 + y^2 + (z_t - z)^2}} \tag{28}$$

and $$d\tilde{I}_2(u, v) = \frac{2\widetilde{N_e}(u)}{\pi K} \cdot \frac{h_0^4 \cdot (h_0 \sin\gamma + (z_t - z)\cos\gamma)}{\sqrt{h_0^2 + y^2 + z^2} \cdot (h_0^2 + y^2 + (z_t - z)^2)^3} \cdot dA_{y,z}(u) \tag{29}$$

TOF sensor 202 can determine the indirect irradiance $dI_2(u,v)$ received by point v on the target object 302 from each defined elementary point source 908 (point u) based on equation (29) (or a reasonable variation thereof). As shown in equation (29), elementary indirect irradiance $dI_2$ is partially a function of angular rotation γ of the target object 302 relative to a line from point v to its corresponding pixel on the sensor 202 (see FIG. 5). In some embodiments, multipath correction component 210 can calculate this angle γ using available target-related pixel information to estimate the vector normal w to the target object's surface (see FIG. 5). For example, multipath correction component 210 may collectively analyze the distances of points on the target object 302 surrounding point v (calculated by the distance determination component 208 from a selected subset of pixels within a defined proximity of the pixel corresponding to point v) in order to determine a topology of the surface of the target object 302 in terms of distances from the sensor 202, and estimate the angular rotation γ based on this topology.

The indirect irradiance $dI_2$ is also partially a function of the scattering area $dA_{y,z}(u)$ of the point source. The factor $\widetilde{N_e}(u)/K$ is the product $\rho_w(u) \cdot I_L(u)$ (see equation (22)) and is obtained based on the measured strength of the optical signal received at the pixel corresponding to point u (the elementary point source 908).

Figure 16:
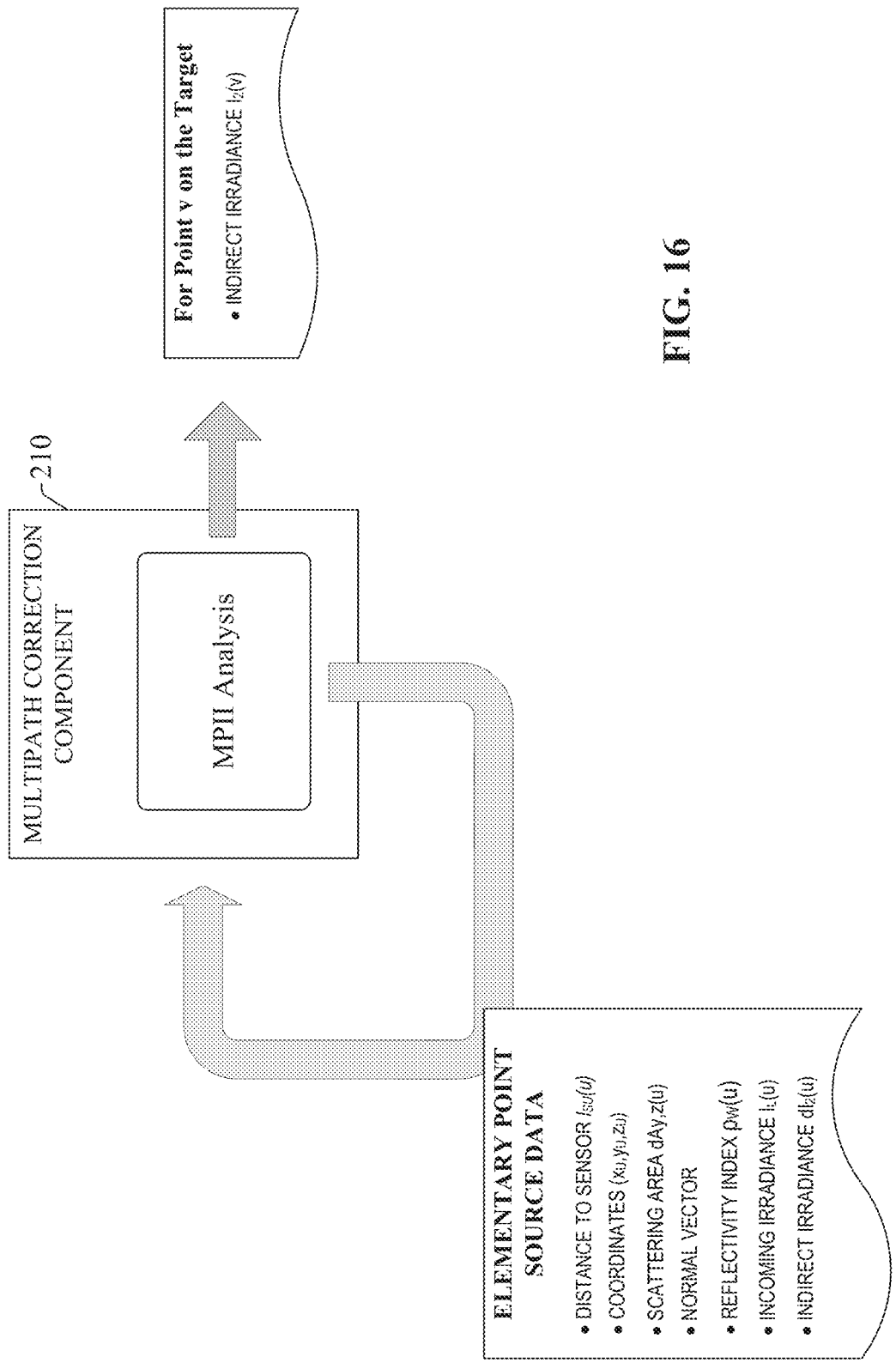
FIG. 16 is a block diagram illustrating performance of MPII analysis by a TOF sensor's multipath correction component.

After the TOF sensor 202 has characterized each elementary point source 908 (that is, each point u) on the background object 304, including determining the indirect irradiance based on equation (29), multipath correction component 210 can perform MPII analysis on the obtained elementary point source data (the parameters obtained for all points u of the background object 304) to generate an estimate of the total secondary irradiance received at point v of the target object 302 from the background object 304. FIG. 16 is a block diagram illustrating performance of MPII analysis by the TOF sensor's multipath correction component 210. Multipath correction component 210 can calculate an estimate of secondary path irradiance onto point v of the target object 302 by performing an integration of the indirect irradiance $dI_2(P_{x,y,z})$ over the total area of the background object 304, as given by:

$$\tilde{I}_2(v) = \tag{30}$$

$$\frac{2 h_0^4}{\pi K} \cdot \int \int_{y,z} \int^{wall} \frac{\tilde{N}_e(u) \cdot (h_0 \sin\gamma + (z_t - z)\cos\gamma)}{\sqrt{h_0^2 + y^2 + z^2} \cdot (h_0^2 + y^2 + (\tilde{z}_t - z)^2)^3} \cdot dA_{y,z}(u)$$

Equation (30) integrates the irradiance represented by equation (29) across all points u on the surface of the background object 304 within the sensor's field of view. Since the example depicted in FIGS. 9 and 11 assumes background object 304 is a perfectly flat vertical wall 912 that resides within in the y-z plane, with the x coordinate being the same ($h_0$) for all points on the surface of the wall 912, the double integral of equation (30) is performed for all points (y,z) across the portion of the wall 912 within the sensor's field of view. However, for background objects that are contoured, tilted, or otherwise do not reside perfectly within a vertical plane, equation (30) can be modified as needed such that the integral is performed over the surface of the background object 304.

Figure 17:
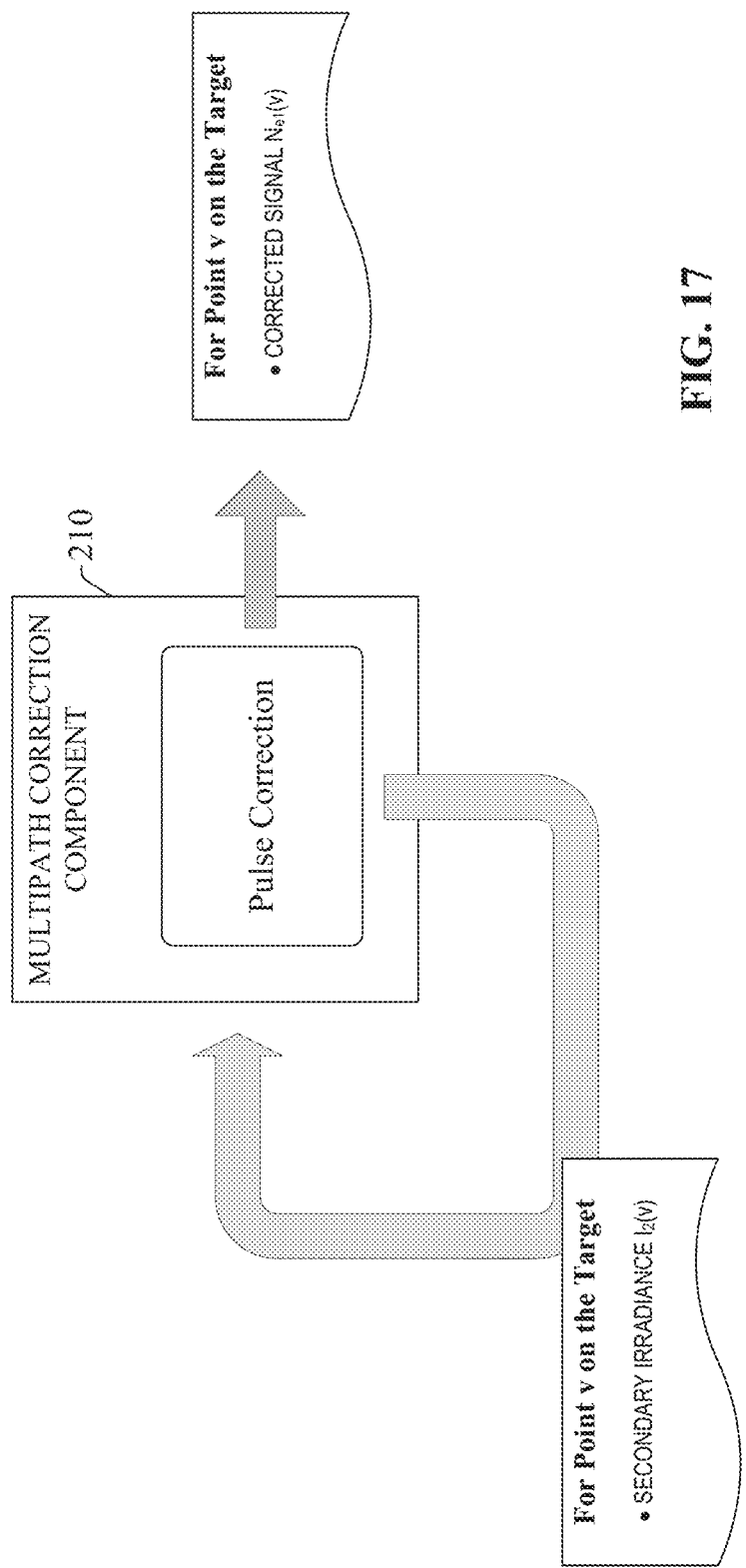
FIG. 17 is a block diagram illustrating pulse correction by a TOF sensor's multipath correction component.

The final step is to correct for this total estimated secondary irradiance received at point v of the target object 302. FIG. 17 is a block diagram illustrating pulse correction by the TOF sensor's multipath correction component 210. Multiplying $d\tilde{I}_2(u, v)$ or $\tilde{I}_2(v)$ (as determined based on equation (30) or a variation thereof) by the constant K and the reflectivity index $\rho_T$ of the target object 302 yields the pixel photocurrent pulse or number of electrons $\widetilde{N_{e2}}(v)$ generated and integrated into the pixel's measuring capacitors (that is the measuring capacitors of the pixel corresponding to point v on the target object 302) due to MPII from the background object 304, as given by:

$$\hat{N}_{e2}(v) = K\rho_T \tilde{I}_2(v) \tag{31}$$

The total number of electrons $\widetilde{N_e}(v)$ measured for the pixel by the TOF sensor 202 represents the sum of the number of electrons $N_{e1}(v)$ due to direct illumination and the number of electrons $\hat{N}_{e2}(v)$ due to secondary (or indirect) illumination, as given by:

$$\widetilde{N_e}(v) = N_{e1}(v) + \hat{N}_{e2}(v) \tag{32}$$

Accordingly, an estimate of the signal received at the pixel without indirect illumination—that is, the portion of the total measured signal due solely to direct illumination—can be obtained by subtracting the number of electrons $\hat{N}_{e2}(v)$ due to secondary irradiance from the total number of electrons $\widetilde{N_e}(v)$ measured for the pixel, as given by:

$$\hat{N}_{e1}(v) = \widetilde{N_e}(v) - \hat{N}_{e2}(v) \tag{33}$$

$\widetilde{N_e}(v)$ is the measured value for the pixel corresponding to point v, which includes both the component due to indirect or secondary illumination and the component due to direct illumination. $\hat{N}_{e2}(v)$ is an estimated value of the indirect illumination component as given by equation (31) based on the total secondary irradiance determined previously from equation (30) (or a variation thereof). Multipath correction component 210 can construct the corrected pulse waveform for the pixel, with the contribution due to secondary illumination removed, by assessing the value of this corrected number of electrons $\hat{N}_{e1}(v)$ as a function of time (e.g., over the duration of time during which the direct pulse was received at the pixel).

Similarly, the corrected photo current waveform can be given as:

$$\hat{I}_{e1}(v) = \widetilde{I_e}(v) - \hat{I}_{e2}(v) \tag{34}$$

where $\hat{I}_{e1}(v)$ is the corrected current representing the contribution of direct illumination only, $\widetilde{I_e}(v)$ is the total measured current at the pixel, and $\hat{I}_{e2}(v)$ is the estimated current at the pixel due to secondary illumination only.

Although equations (33) and (34) obtain corrected measurements by translating the contribution of indirect irradiance to a number of electrons $\hat{N}_{e2}(v)$ or a current $\hat{I}_{e2}(v)$ and subtracting these quantities from the total measured number of electrons $\widetilde{N_e}(v)$ or total measured current $\widetilde{I_e}(v)$, other types of electrical measures may also be used to perform the distance correction. In general, embodiments of the TOF sensor 202 translate the total estimated indirect irradiance $\tilde{I}_2(v)$ (e.g., as given by equation (30)) to an electrical measure (or another representative quantity) representing the contribution of secondary irradiance to the total electrical energy generated by the pixel, and subtracts this electrical measure from the total electrical energy measured at the pixel to yield a corrected signal for the pixel. The TOF sensor 202 uses this corrected signal to construct the pulse waveform due solely to direct irradiance from the point v on the target object, and calculates the pulse propagation time and corresponding distance value for point v based on the constructed pulse waveform.

With knowledge of the waveform of the photo current generated by indirect illumination, multipath correction component 210 can compensate for this contribution of indirect illumination by removing this component from the total measured signal at the pixel, thereby correcting the calculation of the measured distance for the pixel corresponding to point v on target object 302. Similar techniques can used to correct the pixels corresponding to all points v on the target object 302. The distance determination component 208 can determine the corrected distance values for points v on the target object 302 by recalculating the distances based on corrected measured pulse waveforms constructed based on the corrected signals yielded by equation (33) or (34). With reference to the example waveforms depicted in FIGS. 6a-8b, this correction technique can transform the distorted pulses illustrated in FIGS. 8a and 8b to corrected pulses similar to those depicted in FIGS. 6a and 6b.

In some embodiments, TOF sensor 202 may perform multiple iterations of the sequence described above in order to improve the estimation of the indirect illumination used to correct the distance measurement. For example, a first iteration of the distance correction technique described above can yield a first set of corrected distances for the target object 302 (and possibly for the background objects 304 within the field of view as well). Based on this corrected point cloud image 1102, one or more parameters, such as rotational angle γ, can be recomputed using the corrected distance values, and the total indirect irradiance $d\tilde{I}_2$ can be recalculated (e.g., using equation (30)) based on these corrected distance and parameter values, potentially improving the accuracy of the error estimation and correction. In some embodiments, TOF sensor 202 can be configured to perform this iteration a fixed number of times for each measuring sequence, or may be configured to reiterate the MPII error estimation and correction sequence until the results satisfy a defined criterion (e.g., when two consecutive MPII error estimates are within a defined tolerance of one another, suggesting that the error estimation cannot be significantly improved with further iterations).

Figure 18:
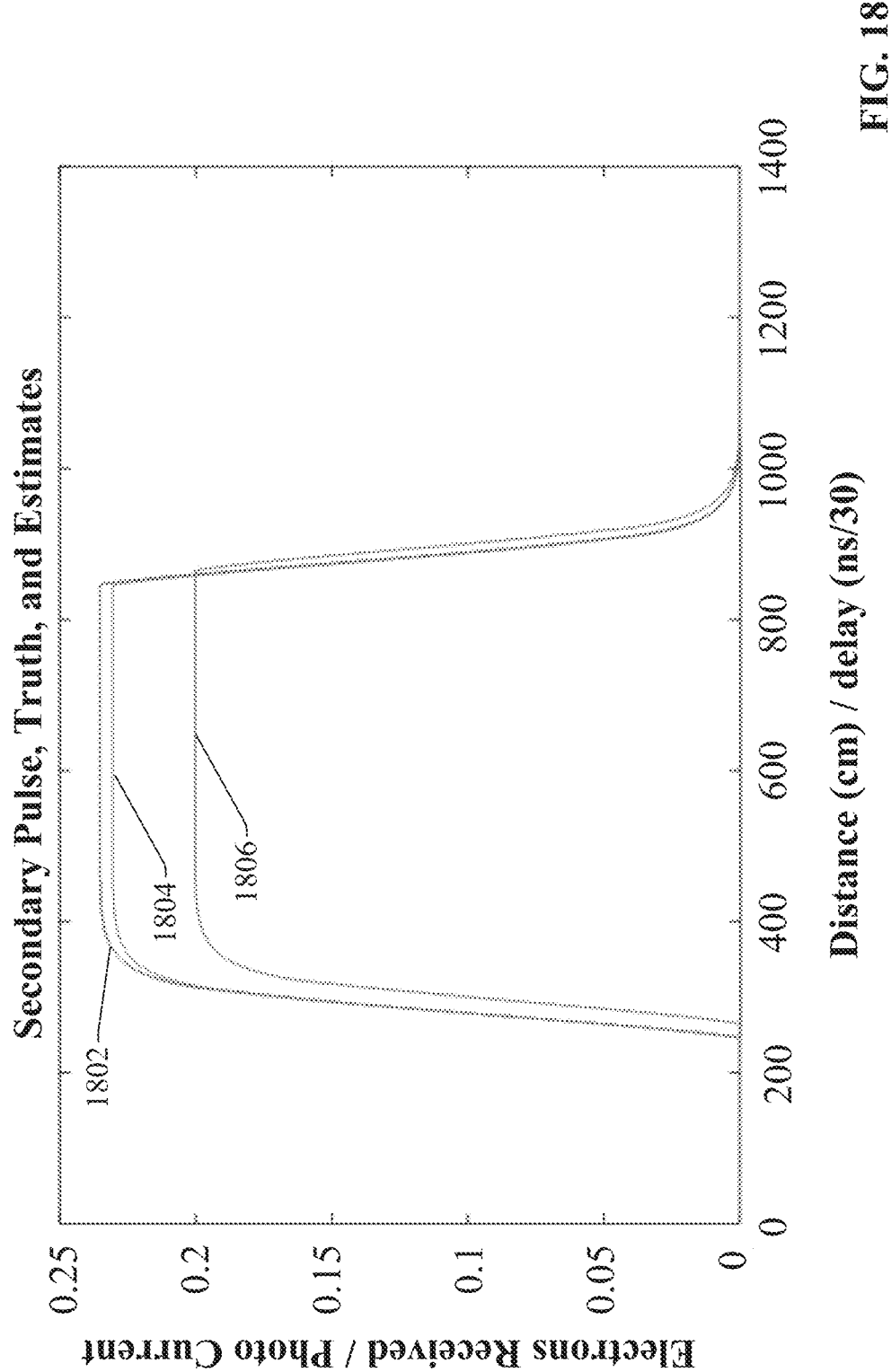
FIG. 18 is a graph plotting electrons generated by a pixel due to secondary illumination for an example scenario.
Figure 19:
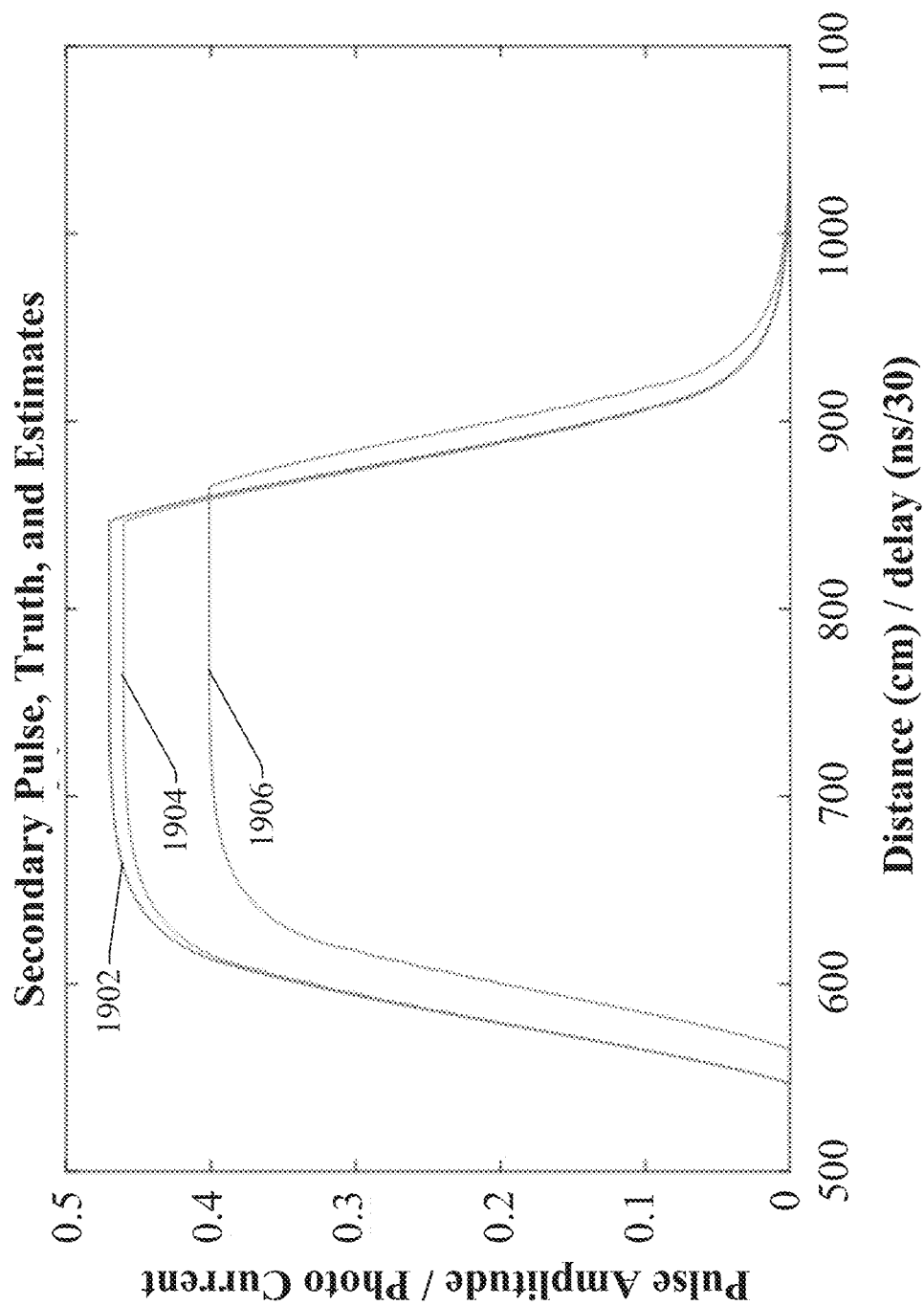
FIG. 19 is a graph plotting pulse amplitude measured at a pixel due to secondary illumination for an example scenario.

FIG. 18 is a graph plotting electrons generated by a pixel due to secondary illumination for an example scenario, and FIG. 19 is a graph plotting a corresponding pulse amplitude measured at the pixel. Curves 1802 and 1902 represents the true pulse waveform based on current conditions. Curves 1804 and 1904 represents a first estimate of the pulse received at the pixel based on information generated by the sensor (e.g., ligh8t received from the wall onto the pixel, light received by the pixel looking at the target, and measured distance of the target). Curves 1806 and 1906 represent a second estimate of the received pulse taking into account the information acquired from the first estimate.

Table 1 below tabulates example distance measurement, errors, and corrections for a 20 ns pulse for two consecutive correction iterations.

TABLE 1

| 20 ns pulse | | | |
|---|---|---|---|
| | $1^{st}$ Iteration | $2^{nd}$ Iteration | Units |
| Reference distance | 400 | 400 | cm |
| Measured distance | 409.7 | 399.7 | cm |
| Error | 9.7 | 0.2 | cm |
| Estimated correction | −10.0 | +0.5 | cm |
| Corrected distance | 399.7 | 400.2 | cm |

Table 2 below tabulates example distance measurement, errors, and corrections for a 10 ns pulse for two consecutive correction iterations.

TABLE 2

| 10 ns pulse | | | |
|---|---|---|---|
| | $1^{st}$ Iteration | $2^{nd}$ Iteration | Units |
| Reference distance | 400 | 400 | cm |
| Measured distance | 409.6 | 399.8 | cm |
| Error | 9.6 | 0.2 | cm |
| Estimated correction | −9.8 | +0.3 | cm |
| Corrected distance | 399.8 | 400.1 | cm |

The TOF sensor's photo-sensor component 206 and distance determination component 208 can use any suitable type of sensor technology to measure pulses received at each pixel. In an example technique, for a pulse received at a given pixel, the photo-sensor component 206 can split the electrical energy generated in proportion to the received pulse between two or more measuring capacitors according to a defined timing relative to the emission of the pulse. With this approach, the relative amounts of electrical energy captured by the measuring capacitors will be a function of the distance traveled by the pulse, and so the distance can be computed based on the ratios between these stored amounts of electrical energy.

Embodiments of the TOF sensor described herein can dynamically estimate the contribution of indirect secondary illumination to pixel-level distance measurements performed on a target object of interest and correct the distance measurements by removing this estimated contribution, thereby improving the accuracy of the distance measurements in the presence of multipath illumination interference. The TOF sensor can estimate this secondary illumination based on discovery, classification, and characterization of background objects that may contribute secondary illumination. The secondary irradiance provided by the background object is estimated based on analysis of point cloud data generated by the sensor for the scene and signal strength information measured by the pixels, without requiring prior knowledge of the background object's shape, size, position, orientation, or reflectivity index. Since the TOF sensor dynamically characterizes the background objects that contribute to multipath illumination based on measured information about the scene, the sensor can quickly react to changes in the background object's reflectivity, position, orientation, shape, or size within the response time.

Figure 20A:
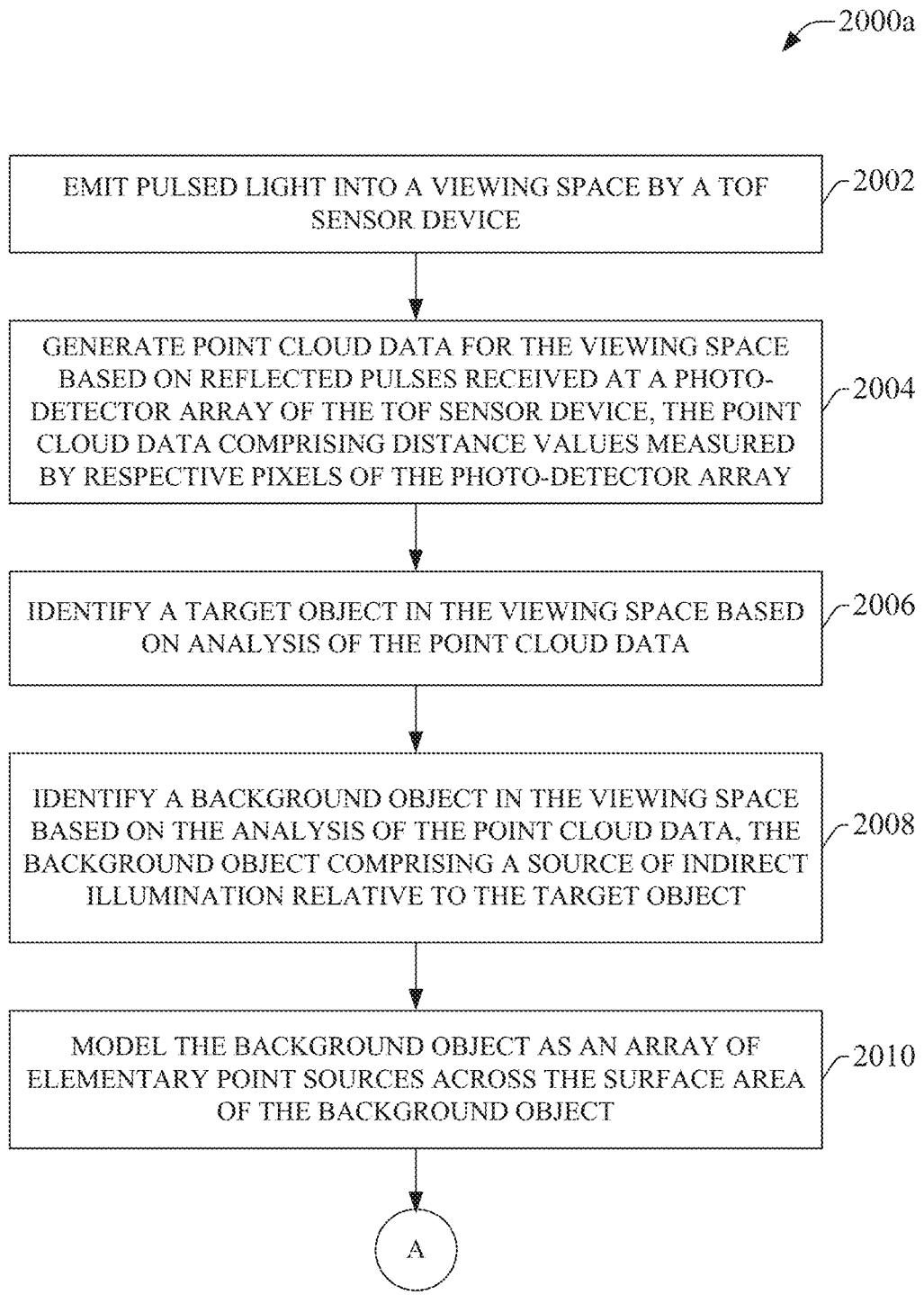
FIG. 20a is a flowchart of a first part of an example methodology for correcting a time-of-flight distance value for a target object by estimating and factoring out effects of multipath illumination interference.
Figure 20B:
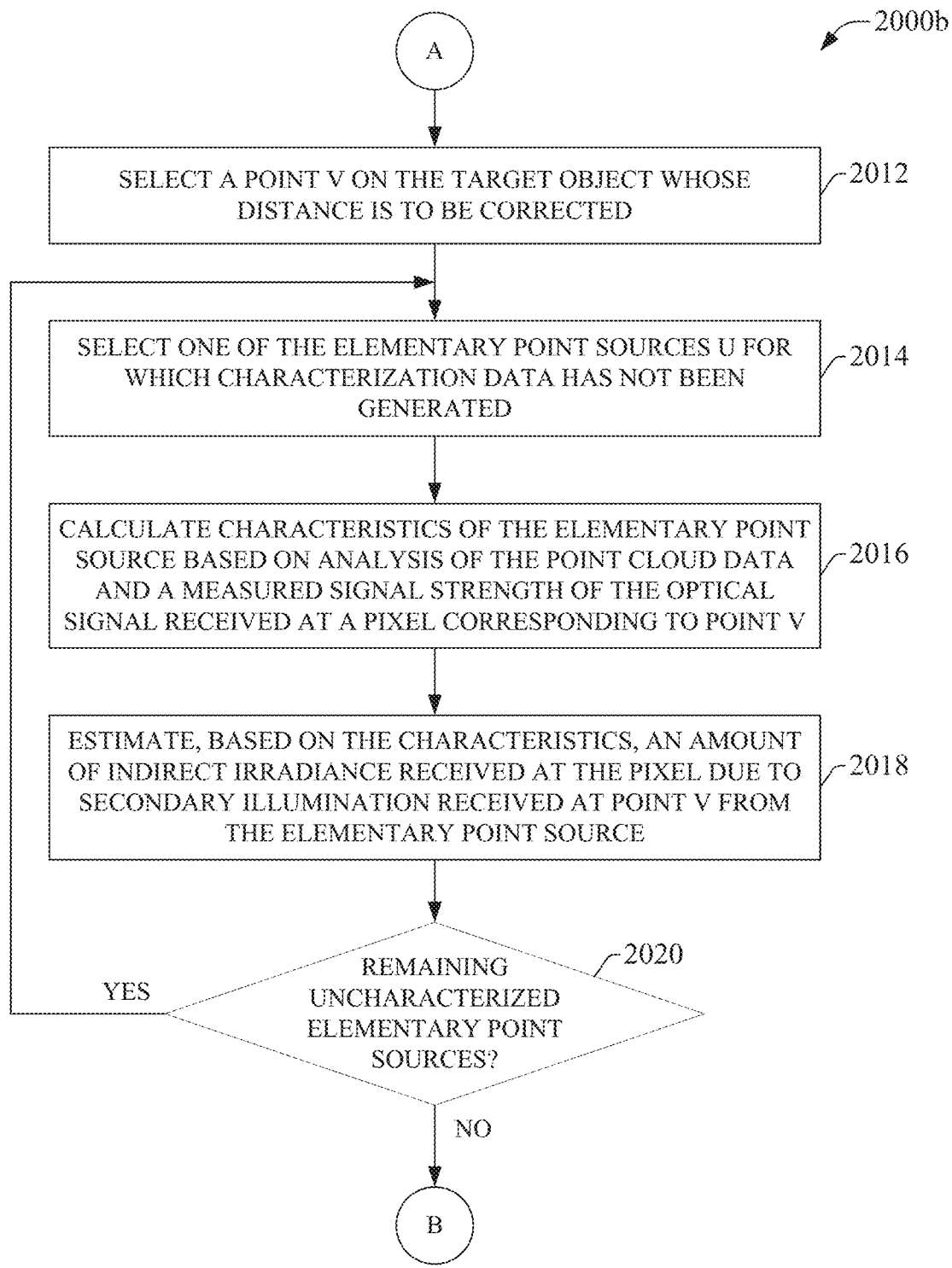
FIG. 20b is a flowchart of a second part of the example methodology for correcting a time-of-flight distance value for a target object by estimating and factoring out effects of multipath illumination interference.
Figure 20C:
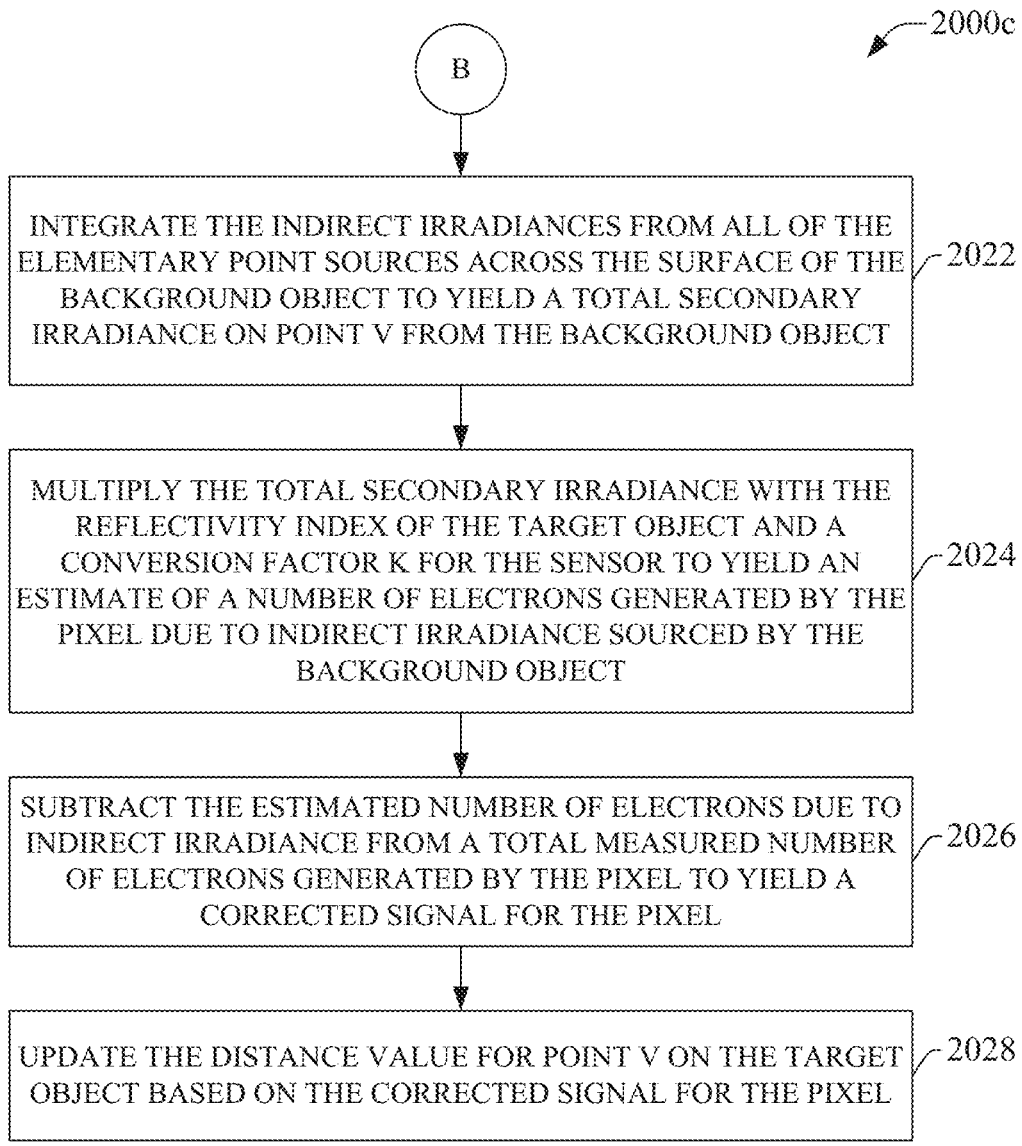
FIG. 20c is a flowchart of a third part of the example methodology for correcting a time-of-flight distance value for a target object by estimating and factoring out effects of multipath illumination interference.

FIGS. 20a-20c illustrate a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 20a illustrates a first part of an example methodology 2000a for correcting a time-of-flight distance value for a target object by estimating and factoring out effects of multipath illumination interference. Initially, at 2002, pulsed light is emitted into a viewing space by a TOF sensor. At 2004, point cloud data for the viewing space is generated based on reflected pulses received at a photo-detector array of the TOF sensor. The point cloud data comprises distance values measured by respective pixels of the photo-detector array based determined propagation times of the received pulses. The propagation times are determined based on analysis of measured waveforms of the received pulses. Any suitable technique for estimating the propagation times of the received pulses and estimating corresponding distance values associated with each pixel are within the scope of one or more embodiments. In this example, it is assumed that the pulse waveforms include contributions from pulses that traverse a direct path between the TOF sensor and the target object as well as secondary illumination pulses that are scattered toward the target object by a background object before being received at the pixel array of the TOF sensor.

At 2006, a target object is identified in the viewing space based on analysis of the point cloud data generated at step 2004. In some embodiments, the target object may be a person, vehicle, machine, or other physical entity that is not part of the recognized background of the monitored scene and which has intruded into a detection zone being monitored by the TOF sensor. Any suitable type of analysis can be applied to the point cloud data to identify the target object, including but not limited to three-dimensional shape analysis, edge detection, or other such techniques.

At 2008, a background object within the viewing space is identified based on analysis of the point cloud data generated at step 2004. The background object is an identified source of indirect illumination relative to the target object. That is, a portion of the pulsed illumination emitted by the TOF sensor's illumination component is expected to reach a point on the target object only after first being reflected off of the background object, yielding a secondary or indirect path of pulsed illumination back to the pixel corresponding to the point on the target object. Pulsed illumination from this indirect path received at the TOF sensor results in multipath illumination interference which can distort the distance measurement for the pixel. In some scenarios, the TOF sensor may be trained to recognize the background object as part of the monitored background of the scene.

At 2010, the background object identified at step 2008 is modeled by the TOF sensor as an array of elementary point sources across the surface area of the background object. In some embodiments, the TOF sensor can define the array of elementary point sources based on a virtual projection of the FOVs of the respective pixels that make up the sensor's pixel array into the monitored scene. In such embodiments, each elementary point source can be defined as the area of the background object's surface that is intersected by one of the pixel-level FOVs. This projection yields a grid of elementary point sources across the surface of the background object. However, other techniques can also be used to generate the grid used to define the elementary points sources, such that the sizes of the elementary points sources are larger or smaller than the pixel FOV projections.

The methodology continues with the second part 2000*b* illustrated in FIG. 20*b*. At 2012, a point v on the target object is selected for distance correction. Point v is a point on the target object that is expected to reflect both direct illumination pulses from illumination received directly from the TOF sensor's illumination component as well as secondary (indirect) pulses received at point v from illumination scattered by the background object. At 2014, one of the elementary point sources of the background object is selected. The elementary point source—referred to as point u—is an elementary point source for which the TOF sensor has not yet generated characterization data.

At 2016, characteristics of the elementary point source selected at point 2014 are calculated based on analysis of the point cloud data (generated at step 2004) as well as a measured signal strength of the optical signal received at the pixel corresponding to the point v that was selected at step 2012. Characteristics of elementary point source u that can be calculated at step 2016 can include, for example, the distance $\widetilde{l_{su}}(u)$ of the elementary point source from the TOF sensor, the coordinates $u(x_u, y_u, z_u)$ of the elementary point source within a three-dimensional coordinate system of the monitored area, the scattering area $dA_{y,z}(u)$ of the elementary point source, the normal vector $\vec{N}$ to the elementary point source (which can be estimated based on the distance information generated by pixels surrounding the elementary point source, which defines a surface topology on which the elementary point source resides), and the product $\rho_w(u) \cdot I_L(u)$ of the reflectivity index and the incoming irradiance (which can be estimated by the sensor based on the measured strength of the signal received at another pixel having the elementary point source within its field of view).

At 2018, an amount of indirect irradiance $dI_2(u,v)$ received at the pixel due to secondary illumination received at point v of the target object from the elementary point source is estimated based on the characteristics calculated at step 2016. In some embodiments, the TOF sensor can calculate this indirect irradiance based on equation (29) above, or a variation thereof, using the characteristics obtained at step 2016 and the angular rotation γ of the target object as parameters. For this step, TOF sensor can calculate the angular rotation γ of the target object relative to a line from point v to the pixel based on the point cloud information generated at step 2004 (e.g., by determining the surface topology on which point v resides based on a collective analysis of the distances of points on the target object surrounding point v and determining the angular rotation γ based on this surface topology).

At 2020, a determination is made as to whether there are remaining elementary point sources that have not yet been characterized using steps 2016 and 2018. If there are remaining uncharacterized elementary point sources (YES at step 2020), the methodology returns to step 2014, another elementary point source that has not yet been characterized is selected, and steps 2016 and 2018 are repeated for the newly selected elementary point source. Steps 2014-2020 repeat until all defined elementary point sources (or a defined number of elementary point sources) have been characterized.

When there are no remaining elementary point sources to be characterized (NO at step 2020), the methodology proceeds to the third part 2000*c* illustrated in FIG. 20*c*. At 2022, the indirect irradiances from all of the elementary point sources (obtained at step 2018) are integrated across the surface of the background object to yield a total secondary irradiance on point v from the background object. In some embodiments, the TOF sensor can calculate this total indirect irradiance based on equation (30) (or a variation thereof). At 2024, the total secondary irradiance obtained at step 2022 is multiplied with the reflectivity index of the target object and a conversion factor K for the sensor to yield an estimate of the number of electrons generated by the pixel due to indirect irradiance sourced by the background object. At 2026, the estimated number of electrons due to indirect irradiance (obtained at step 2024) is subtracted from a total measured number of electrons generated by the pixel to yield a corrected signal for the pixel. Performing steps 2014-2026 across a time range during which direct and indirect pulses are received at the pixel yields a corrected signal at step 2026 representing a reconstructed pulse waveform that is solely a function of direct illumination pulses (and possibly ambient light), with the contribution of estimated indirect (secondary) pulses removed. At 2028, the distance value for point v on the target object is updated based on the corrected signal for the pixel obtained at step 2026.

The methodology described above in connection with FIGS. 20*a*-20*c* performs MPII correction for a single pixel of the sensor's pixel array corresponding to a point v on the target object. For a given measuring sequence, this MPII estimation and correction methodology can be applied to multiple points v on the target object detected at step 2006. For example, after updating the distance value for the selected point v at step 2028, the methodology can return to step 2012 to select another point v on the target object and repeat steps 2014-2028 to estimate MPII for the newly selected point v due to the background object and correct the distance value accordingly.

Also, in some embodiments, some or all of the steps 2002-2028 can be iterated more than once during a given measuring sequence, with the updated distance values obtained at step 2028 being used to update the point cloud data generated at step 2004 for use in the subsequent iteration. The updated point cloud data can yield more accurate elementary point source characteristics, target source rotational angles, and indirect irradiance estimates at steps 2016 and 2018, resulting in a further refinement of the distance value at step 2028. This iteration can be performed a fixed number of times for each measuring cycle, or may be repeated until the results satisfy a defined stopping criterion (e.g., when two sequential distance values are within a defined tolerance of one another, indicating that further iterations will not result in substantive updates to the distance value).

Embodiments of the TOF sensor 202 described above can produce accurate distance measurements even when used in environments susceptible to multipath illumination interference. This high level of measurement reliability can render embodiments of TOF sensor 202 suitable for use as safety monitoring devices within the context of an industrial safety system. In such systems, the control output component 212 can be configured to generate a safety output in response to a determination by the distance determination component 208 (based on distance values that have been corrected by multipath correction component 210) that an object or person has intruded within the monitored protective field. In an example scenario, TOF sensor 202 may be configured to monitor an area surrounding a hazardous industrial machine or automation system to ensure that people or objects (e.g., vehicles such as fork lifts) do not approach the hazardous area within a defined minimum safe distance. Accordingly, control output component 212 can be configured to generate a safety output in response to a determination that one or more of the distance values generated by pixels having the intrusive entity within their field of view are less than the defined safety distance.

In a variation of such embodiments, after identifying the intrusive target object and performing the distance corrections to account for MPII, the TOF sensor 202 may select a window comprising N pixels from among the pixels corresponding to the target object and determine that the entity is within the minimum safe distance if at least a defined minimum number M of distance values generated by this window of pixels are less than the defined safe distance. In response to this determination, the control output component 212 can be instruction to generate a safety output signal.

In some applications, the hazardous area may be defined as a distance range that begins a first distance away from the TOF sensor 202 and ends at a second, longer distance area from the TOF sensor 202. In such applications, the control output component 212 may be configured to generate the safety output signal in response to determining that distance values for one or more of the pixels corresponding to the target object (e.g., at least a defined minimum number of pixels) are within this distance band defined by the first and second distances.

The action initiated by the control output component 212 can depend on the type of safety application within which the TOF sensor 202 is being used. In various non-limiting examples, a safety output signal generated by control output component 212 may be configured to disconnect power from the monitored automation system or machine, place the system or machine in a safe mode (e.g., a slow operation mode), send a notification to one or more client devices to alert personnel that a person or object has been detected within the hazardous area, or perform other such safety actions.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 21:
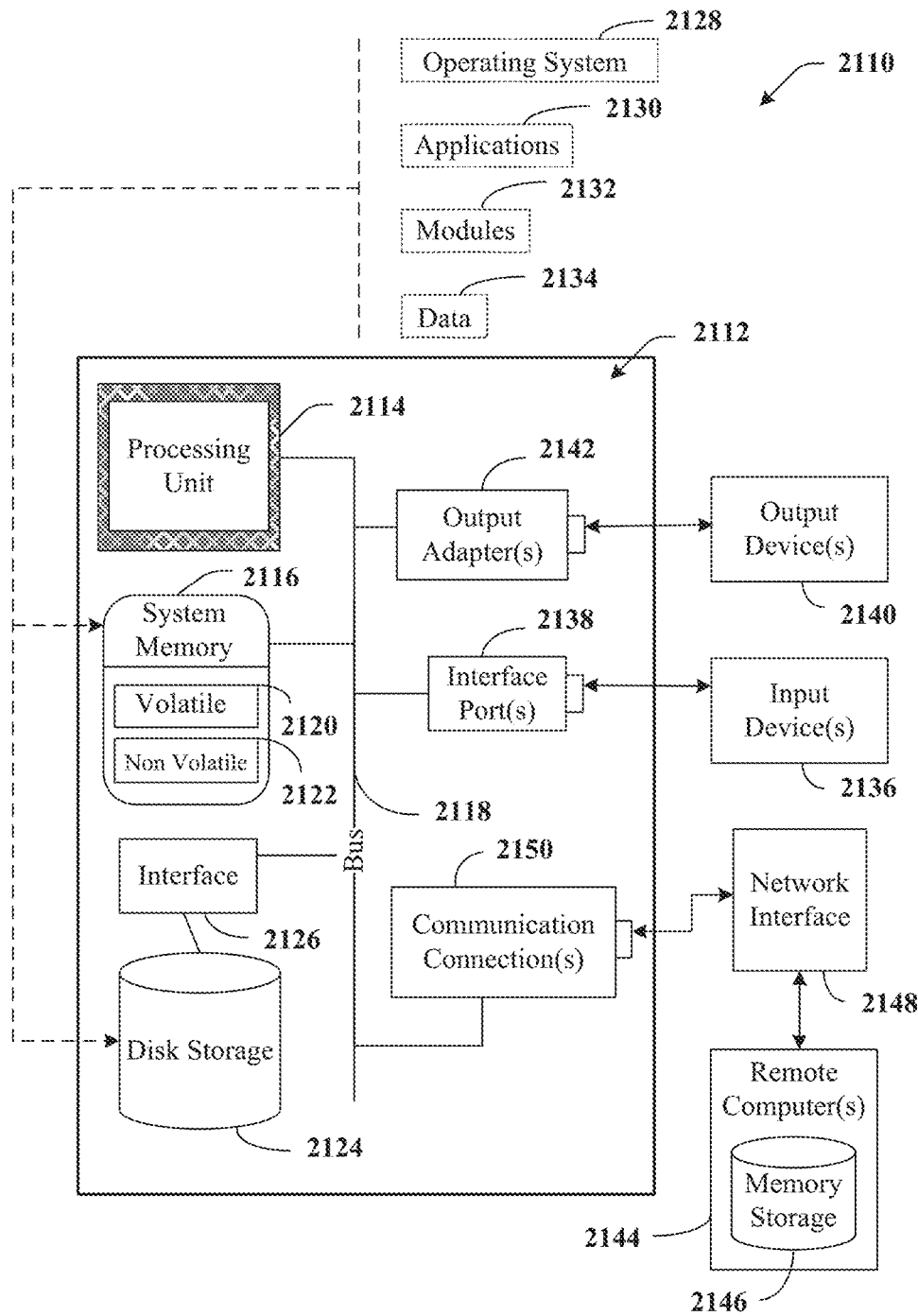
FIG. 21 is an example computing environment.
Figure 22:
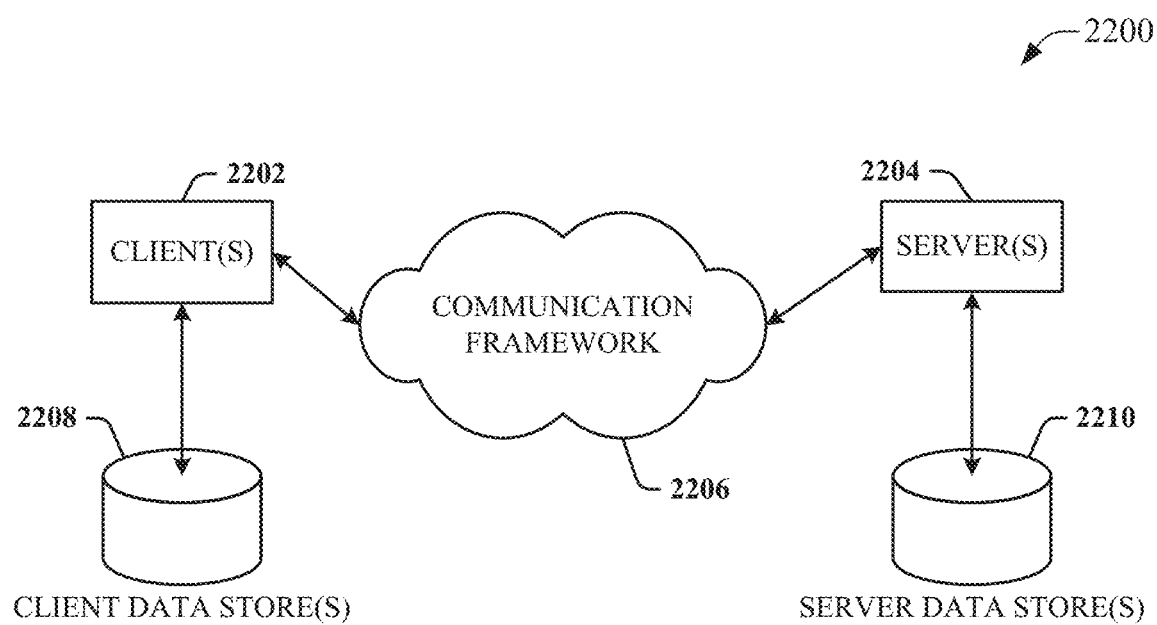
FIG. 22 is an example networking environment.

In order to provide a context for the various aspects of the disclosed subject matter, FIGS. 21 and 22 as well as the following discussion are intended to provide a brief, general description of a suitable environment in which the various aspects of the disclosed subject matter may be implemented.

With reference to FIG. 21, an example environment 2110 for implementing various aspects of the aforementioned subject matter includes a computer 2112. The computer 2112 includes a processing unit 2114, a system memory 2116, and a system bus 2118. The system bus 2118 couples system components including, but not limited to, the system memory 2116 to the processing unit 2114. The processing unit 2114 can be any of various available processors. Multi-core microprocessors and other multiprocessor architectures also can be employed as the processing unit 2114.

The system bus 2118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2116 includes volatile memory 2120 and nonvolatile memory 2122. The basic input/output system (BIOS), containing the basic routines to transfer information between elements within the computer 2112, such as during start-up, is stored in nonvolatile memory 2122. By way of illustration, and not limitation, nonvolatile memory 2122 can include read only memory (ROM), programmable ROM (PROM), electrically programmable ROM (EPROM), electrically erasable PROM (EEPROM), or flash memory. Volatile memory 2120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2112 also includes removable/non-removable, volatile/non-volatile computer storage media. FIG. 21 illustrates, for example a disk storage 2124. Disk storage 2124 includes, but is not limited to, devices like a magnetic disk drive, floppy disk drive, tape drive, Jaz drive, Zip drive, LS-100 drive, flash memory card, or memory stick. In addition, disk storage 2124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2124 to the system bus 2118, a removable or non-removable interface is typically used such as interface 2126.

It is to be appreciated that FIG. 21 describes software that acts as an intermediary between users and the basic computer resources described in suitable operating environment 2110. Such software includes an operating system 2128. Operating system 2128, which can be stored on disk storage 2124, acts to control and allocate resources of the computer 2112. System applications 2130 take advantage of the management of resources by operating system 2128 through program modules 2132 and program data 2134 stored either in system memory 2116 or on disk storage 2124. It is to be appreciated that one or more embodiments of the subject disclosure can be implemented with various operating systems or combinations of operating systems.

A user enters commands or information into the computer 2112 through input device(s) 2136. Input devices 2136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2114 through the system bus 2118 via interface port(s) 2138. Interface port(s) 2138 include, for example, a serial port, a parallel port, a game port, and a universal serial bus (USB). Output device(s) 2140 use some of the same type of ports as input device(s) 2136. Thus, for example, a USB port may be used to provide input to computer 2112, and to output information from computer 2112 to an output device 2140. Output adapters 2142 are provided to illustrate that there are some output devices 2140 like monitors, speakers, and printers, among other output devices 2140, which require special adapters. The output adapters 2142 include, by way of illustration and not limitation, video and sound cards that provide a means of connection between the output device 2140 and the system bus 2118. It should be noted that other devices and/or systems of devices provide both input and output capabilities such as remote computer(s) 2144.

Computer 2112 can operate in a networked environment using logical connections to one or more remote computers, such as remote computer(s) 2144. The remote computer(s) 2144 can be a personal computer, a server, a router, a network PC, a workstation, a microprocessor based appliance, a peer device or other common network node and the like, and typically includes many or all of the elements described relative to computer 2112. For purposes of brevity, only a memory storage device 2146 is illustrated with remote computer(s) 2144. Remote computer(s) 2144 is logically connected to computer 2112 through a network interface 2148 and then physically connected via communication connection 2150. Network interface 2148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2150 refers to the hardware/software employed to connect the network interface 2148 to the system bus 2118. While communication connection 2150 is shown for illustrative clarity inside computer 2112, it can also be external to computer 2112. The hardware/software necessary for connection to the network interface 2148 includes, for exemplary purposes only, internal and external technologies such as, modems including regular telephone grade modems, cable modems and DSL modems, ISDN adapters, and Ethernet cards.

FIG. 22 is a schematic block diagram of a sample computing environment 2200 with which the disclosed subject matter can interact. The sample computing environment 2200 includes one or more client(s) 2202. The client(s) 2202 can be hardware and/or software (e.g., threads, processes, computing devices). The sample computing environment 2200 also includes one or more server(s) 2204. The server(s) 2204 can also be hardware and/or software (e.g., threads, processes, computing devices). The servers 2204 can house threads to perform transformations by employing one or more embodiments as described herein, for example. One possible communication between a client 2202 and servers 2204 can be in the form of a data packet adapted to be transmitted between two or more computer processes. The sample computing environment 2200 includes a communication framework 2206 that can be employed to facilitate communications between the client(s) 2202 and the server(s) 2204. The client(s) 2202 are operably connected to one or more client data store(s) 2208 that can be employed to store information local to the client(s) 2202. Similarly, the server(s) 2204 are operably connected to one or more server data store(s) 2210 that can be employed to store information local to the servers 2204.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A sensor device, comprising:
    an emitter component configured to emit light pulses into a monitored scene;
    a photo-sensor component comprising an array of pixels, wherein respective pixels of the array of pixels are configured to convert a subset of the light pulses received from the monitored scene to electrical energy proportional to the subset of the light pulses received at the pixels;
    a distance determination component configured to determine distance values associated with the respective pixels based on analysis of the electrical energy and to generate a point cloud image comprising the distance values; and
    a multipath correction component configured to
        identify a first portion of the point cloud image representing a target object,
        identify a second portion of the point cloud image representing a background object,
        model the background object as an array of elementary point sources based on the distance values of the point cloud image,
        estimate amounts of indirect irradiance directed to a point on the target object by the elementary point sources and received at a pixel, of the array of pixels, corresponding to the point on the target object,
        aggregate the amounts of indirect irradiance to yield a total estimated indirect irradiance directed to the point on the target object and received at the pixel, and
        adjust a distance value, of the distance values, associated with the pixel based on the total estimated indirect irradiance to yield an updated distance value for the point on the target object.

2. The sensor device of claim 1, wherein the multipath correction component is configured to define the array of elementary point sources as projections of fields of view of the array of pixels onto a surface of the background object.

3. The sensor device of claim 1, wherein the multipath correction component is configured to,
    for each elementary point source of the array of elementary point sources, determine a set of point source characteristics based on analysis of the point cloud image and a measured strength of an optical signal received at another pixel, of the array of pixels, corresponding to the elementary point source, and
    estimate, as one of the amounts of indirect irradiance, an amount of indirect irradiance directed to the point on the target object by the elementary point source based on the set of point source characteristics.

4. The sensor device of claim 3, wherein the set of point source characteristics comprise at least one of a distance of the elementary point source from the sensor device, a three-dimensional coordinate of the elementary point source within the point cloud image, a scattering area of the elementary point source, a normal vector to the elementary point source, or a product of a reflectivity index of the elementary point source and an incoming irradiance received at the elementary point source.

5. The sensor device of claim 3, wherein the multipath correction component is configured to
    determine a rotational angle of the target object based on analysis of the point cloud image, and
    estimate the amount of indirect irradiance further based on the rotational angle.

6. The sensor device of claim 5, wherein the multipath correction component is configured to determine the rotational angle of the target object based on analysis of a subset of the distance values corresponding to an area of the target object within a defined proximity of the point on the target object.

7. The sensor device of claim 1, wherein the multipath correction component is configured to
    translate the total estimated indirect irradiance to an electrical measure representing a contribution of the total estimated indirect irradiance to a total electrical energy generated by the pixel corresponding to the point on the target object, subtract the electrical measure from the total electrical energy generated by the pixel to yield a corrected electrical measure, and adjust the distance value associated with the pixel based on the corrected electrical measure to yield the updated distance value.

8. The sensor device of claim 1, wherein the multipath correction component is further configured to re-estimate the amounts of indirect irradiance based on the updated distance value to yield updated amounts of indirect irradiance, aggregate the updated amounts of indirect irradiance to yield an updated total estimated indirect irradiance, and adjust the updated distance value based on the updated total estimated indirect irradiance to yield a refined updated distance value.

9. The sensor device of claim 1, further comprising a control output component configured to generate a safety output signal in response to determining that the updated distance value satisfies a defined criterion.

10. A method for correcting errors in measured distance values caused by multipath illumination interference, comprising:

emitting, by a sensor device comprising a processor, light pulses into a monitored area;

for respective pixels of a pixel array of the sensor device, generating, by the sensor device, electrical energy proportional to a subset of the light pulses received at the respective pixels from surfaces within the monitored area;

determining, by the sensor device based on measurements of the electrical energy for the respective pixels, distance values associated with the respective pixels;

generating, by the sensor device, a point cloud image comprising the distance values;

identifying, by the sensor device, a target object represented by a first portion of the point cloud image;

identifying, by the sensor device, a background object represented by a second portion of the point cloud image;

modeling, by the sensor device, an array of elementary point sources across a surface of the background object based on analysis of the second portion of the point cloud image;

estimating, by the sensor device, respective levels of indirect irradiance directed to a point on the target object by the elementary point sources and received at a pixel, of the array of pixels, corresponding to the point on the target object;

integrating, by the sensor device, the levels of indirect irradiance to yield a total estimated indirect irradiance directed to the point on the target object and received at the pixel; and modifying, by the sensor device, a distance value, of the distance values, associated with the pixel based on the total estimated indirect irradiance to yield an updated distance value for the point on the target object.

11. The method of claim 10, wherein the modeling comprises modeling projections of respective fields of view of the array of pixels onto the surface of the background object, and defining the array of elementary point sources as intersections of the respective fields of view with the surface of the background object.

12. The method of claim 10, wherein the estimating the respective levels of indirect irradiance comprises:

for each elementary point source of the array of elementary point sources, determining characteristics of the elementary point source based on analysis of the point cloud image and a measured strength of an optical signal received at another pixel, of the array of pixels, corresponding to the elementary point source, and estimating, as one of the levels of indirect radiance, a level of indirect irradiance directed to the point on the target object by the elementary point source based on the characteristics of the elementary point source.

13. The method of claim 12, wherein the determining the characteristics comprises determining at least one of a distance of the elementary point source from the sensor device, a three-dimensional coordinate of the elementary point source within the point cloud image, a scattering area of the elementary point source, a normal vector to the elementary point source, or a product of a reflectivity index of the elementary point source and an incoming irradiance received at the elementary point source.

14. The method of claim 12, wherein the estimating the respective levels of indirect irradiance further comprises:

determining an angular rotation of the target object based on analysis of the point cloud image, and estimating the level of indirect irradiance further based on the angular rotation.

15. The method of claim 14, wherein the determining the angular rotation comprises selecting a subset of pixels of the pixel array corresponding to a portion of a surface of the target object within a defined proximity of the point on the target object, determining, based on analysis of a subset of the distance values associated with the subset of the pixels, a topology of the portion of a surface of the target object, and determining the angular rotation of the target object based on analysis of the topology.

16. The method of claim 10, wherein the modifying the distance value comprises:

translating the total estimated indirect irradiance to an electrical value representing a contribution of the total estimated indirect irradiance to a total electrical energy generated by the pixel corresponding to the point on the target object, subtracting the electrical value from the total electrical energy generated by the pixel to yield a corrected electrical signal, and modifying the distance value associated with the pixel based on the corrected electrical signal to yield the updated distance value.

17. The method of claim 10, further comprising:

re-estimating, by the sensor device, the respective levels of indirect irradiance based on the updated distance value to yield updated levels of indirect irradiance, integrating, by the sensor device, the updated levels of indirect irradiance to yield an updated total estimated indirect irradiance, and modifying, by the sensor device, the updated distance value based on the updated total estimated indirect irradiance to yield a refined updated distance value.

18. The method of claim 10, further comprising:

in response to determining that the updated distance value satisfies a defined criterion, generating, by the sensor device, a safety output signal.

19. A non-transitory computer-readable medium having stored thereon instructions that, in response to execution, cause a sensor device to perform operations, the operations comprising:

emitting light pulses into a monitored scene;

for respective pixels of a pixel array of the sensor device, generating electrical energy proportional to a subset of the light pulses scattered by surfaces within the monitored scene and received at the respective pixels;

determining, based on measurements of the electrical energy for the respective pixels, distance values associated with the respective pixels;

generating point cloud data comprising the distance values;

identifying a first portion of the point cloud data representing a target object in the monitored scene;

identifying a second portion of the point cloud data representing a background object in the monitored scene;

modeling an array of elementary point sources across a surface of the background object based on analysis of the second portion of the point cloud data;

estimating respective quantities of indirect irradiance directed to a point on the target object by the elementary point sources and received at a pixel, of the array of pixels, corresponding to the point on the target object;

integrating the quantities of indirect irradiance to yield a total estimated indirect irradiance directed to the point on the target object and received at the pixel; and updating a distance value, of the distance values, associated with the pixel based on the total estimated indirect irradiance to yield an updated distance value for the point on the target object.

20. The non-transitory computer-readable medium of claim 19, wherein the estimating the respective quantities of indirect irradiance comprises:

for each elementary point source of the array of elementary point sources, determining characteristics of the elementary point source based on analysis of the point cloud image and a measured strength of an optical signal received at another pixel, of the array of pixels, corresponding to the elementary point source, and estimating, as one of the quantities of indirect radiance, a level of indirect irradiance directed to the point on the target object by the elementary point source based on the characteristics of the elementary point source.

* * * * *